(12) United States Patent
Piaskowski et al.

(10) Patent No.: US 11,269,300 B2
(45) Date of Patent: Mar. 8, 2022

(54) BUILDING MANAGEMENT SYSTEM WITH WIRELESS POWER

(71) Applicant: Johnson Controls Technology Company, Auburn Hills, MI (US)

(72) Inventors: Ryan A. Piaskowski, Milwaukee, WI (US); Joseph H. Klotz, Dover, NH (US); Matthew J. Deloge, Mequon, WI (US); Matthew F. Malcolm, Brookfield, WI (US); Robert H. Harland, Hendersonville, TN (US); Radu M. Dorneanu, Greendale, WI (US); Brian J. Pfeifer, Sussex, WI (US); Karl F. Reichenberger, Mequon, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/592,239

(22) Filed: Oct. 3, 2019

(65) Prior Publication Data
US 2020/0110374 A1 Apr. 9, 2020

Related U.S. Application Data

(60) Provisional application No. 62/742,156, filed on Oct. 5, 2018.

(51) Int. Cl.
*H02J 50/80* (2016.01)
*G05B 15/02* (2006.01)
*G05F 1/66* (2006.01)

(52) U.S. Cl.
CPC .............. *G05B 15/02* (2013.01); *G05F 1/66* (2013.01); *H02J 50/80* (2016.02)

(58) Field of Classification Search
CPC . G05B 15/02; G05B 2219/25011; G05F 1/66; H02J 50/80; H02J 7/025; H02J 5/005
See application file for complete search history.

(56) References Cited

U.S. PATENT DOCUMENTS

| 10,156,833 | B2 | 12/2018 | Ray et al. |
| 2015/0284990 | A1* | 10/2015 | Hall .................. E06B 9/326 |
| | | | 74/606 R |

(Continued)

OTHER PUBLICATIONS

Shinohara, Naoki, et al. "New application of microwave power transmission for wireless power distribution system in buildings." 2008 Asia-Pacific Microwave Conference. IEEE, 2008. (Year: 2008).*

(Continued)

*Primary Examiner* — Michael D Masinick
(74) *Attorney, Agent, or Firm* — Foley & Lardner LLP

(57) ABSTRACT

A building management system of a building including one or more computer-readable storage media having instructions that cause the one or more processors to operate a wireless power transmitter to transmit wireless power to one or more first building devices located within a zone of the building. The instructions cause the one or more processors to receive an indication of a zone power mode for the zone and operate the wireless power transmitter to switch from transmitting the wireless power to the one or more first building devices to transmitting the wireless power to one or more second building devices located within the zone of the building, wherein the one or more second building devices are indicated by the zone power mode, wherein at least one building device of the one or more second building devices is a different building device than the one or more first building devices.

20 Claims, 36 Drawing Sheets

(56) References Cited

U.S. PATENT DOCUMENTS

2017/0288468 A1* 10/2017 Pearson .................. H02J 50/23
2019/0199548 A1    6/2019 Ray et al.
2019/0239033 A1*  8/2019 Douglas ................ H04W 12/03
2020/0110374 A1*  4/2020 Piaskowski ............... G05F 1/66

OTHER PUBLICATIONS

Zhang, Ziqi. "Fractional-order time-sharing-control-based wireless power supply for multiple appliances in intelligent building." Journal of Advanced Research (2020). (Year: 2020).*

* cited by examiner

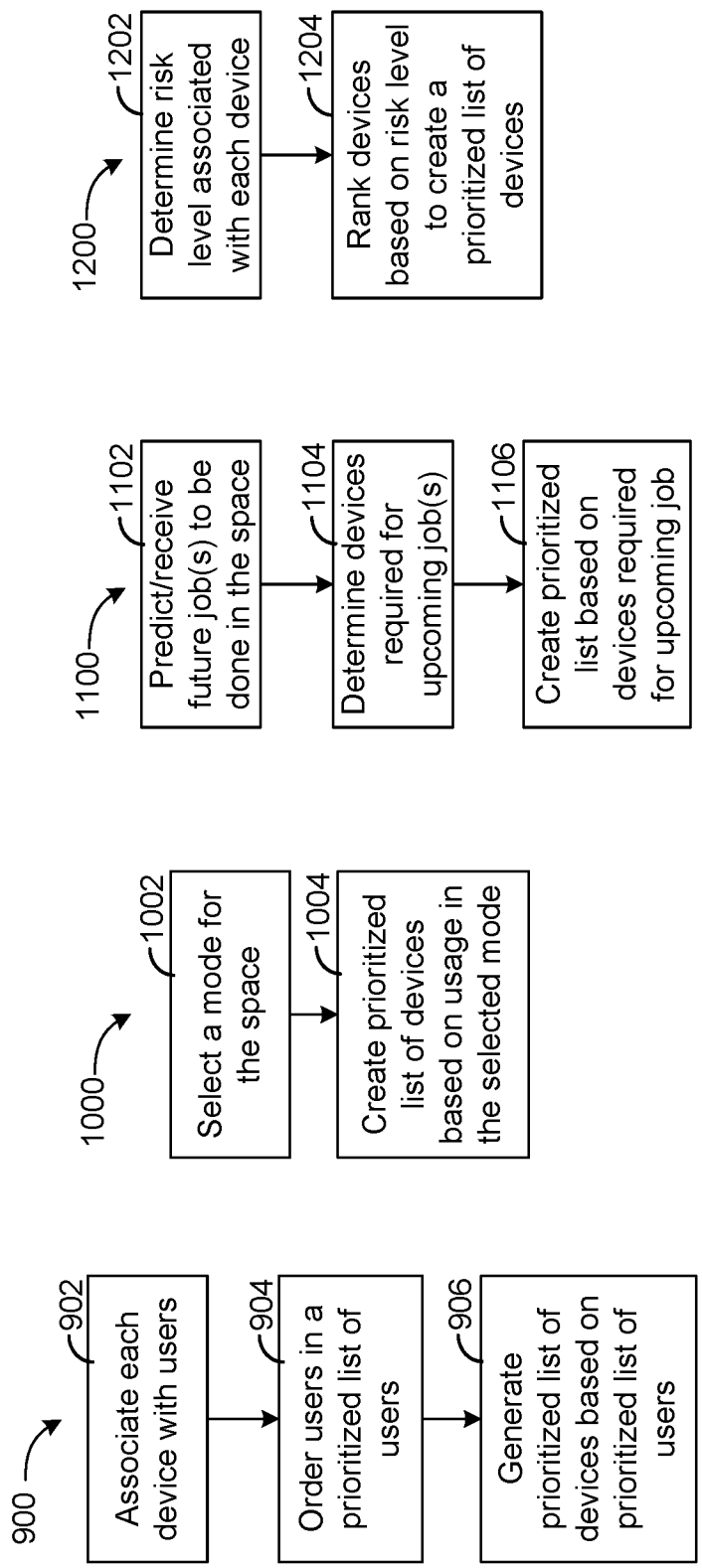

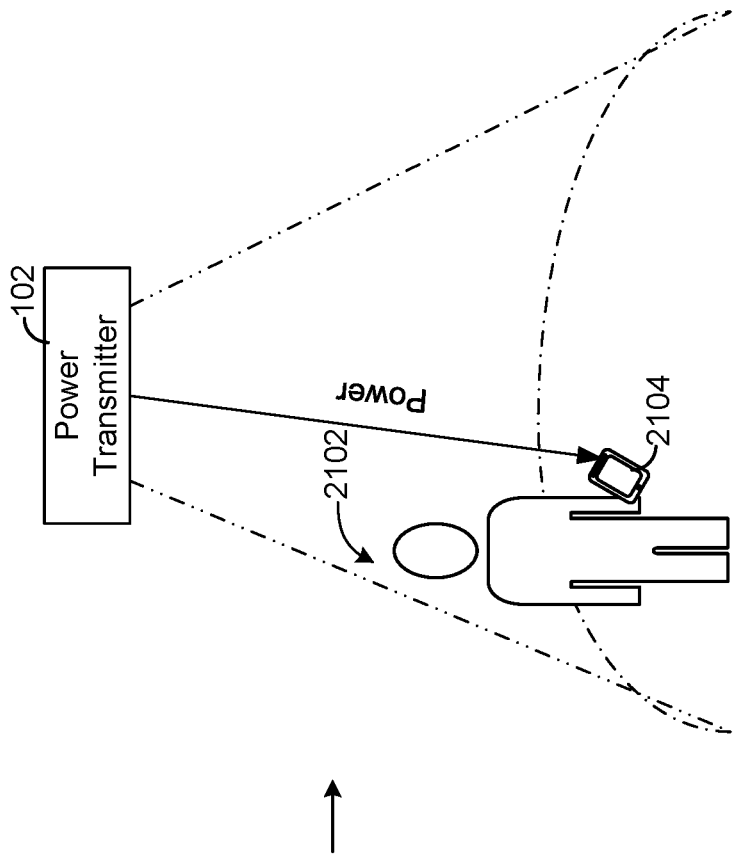
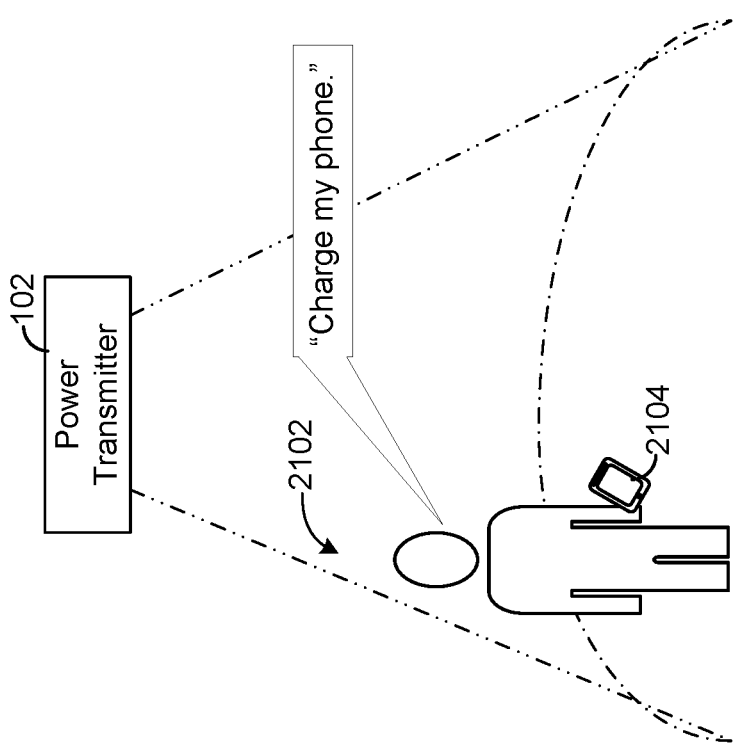
FIG. 21

BUILDING MANAGEMENT SYSTEM WITH WIRELESS POWER

CROSS-REFERENCE TO RELATED PATENT APPLICATION

This application claims the benefit of and priority to U.S. Provisional Patent Application No. 62/742,156 filed Oct. 5, 2018, the entire disclosure of which is incorporated by reference herein.

BACKGROUND

The present disclosure generally relates to the field of building management systems. The present disclosure more particularly relates to systems and methods for wirelessly transmitting power to various devices of a building configured to receive wireless power.

Wireless power transfer may be a transfer of power without wires or connections, i.e., through a medium such as air. The wireless power transfer may be near-field or far-field. Near-field power transfer may be the transfer of power through inductive coupling between a transmitting device and a receiving device over a short distance (e.g., on the order of inches). Far-field power transfer may be performed with radiative techniques where electromagnetic radiation is transmitted across longer distances (e.g., on the order of feet, tens of feet, across a room of a building, down hallways of a building, etc.) between the transmitting device and the receiving device, e.g., by using transmission techniques such as beamforming. Electronic devices may thereby operate or charge based on wireless power received from the transmitting device without requiring a connection to an outlet or other wired power source.

SUMMARY

A building management system of a building including one or more computer-readable storage media having instructions stored thereon that, when executed by one or more processors, cause the one or more processors to operate a wireless power transmitter to transmit wireless power to one or more first building devices located within a zone of the building. The instructions cause the one or more processors to receive an indication of a zone power mode for the zone. The instructions cause the one or more processors to operate the wireless power transmitter to switch from transmitting the wireless power to the one or more first building devices to transmitting the wireless power to one or more second building devices located within the zone of the building, wherein the one or more second building devices are indicated by the zone power mode, wherein at least one building device of the one or more second building devices is a different building device than the one or more first building devices.

In some embodiments, the one or more first building devices include a zone sensor configured to measure an environmental condition of the zone with the wireless power.

In some embodiments, at least one of the one or more first building devices or the one or more second building devices include at least one of security devices configured to perform security functions for the zone, heating, ventilation, and air conditioning devices configured to control an environmental condition of the zone, and one or more fire suppression devices configured to identify a fire and suppress the fire.

In some embodiments, one building device of the one or more first building devices is also a building device of the one or more second building devices. In some embodiments, the instructions cause the one or more processors to cause the wireless power transmitter to provide a first level of wireless power to the one building device and cause the wireless power transmitter to provide a second level of wireless power to the one building device in response to receiving the indication of the zone power mode for the zone.

In some embodiments, a building device of the one or more first building devices is a building device type different than another building device type of another building device of the one or more second building devices.

In some embodiments, the zone power mode is a presentation mode, wherein the one or more first building devices include a lighting device and the one or more second building devices include a projector.

In some embodiments, the one or more first building devices are a first plurality of building devices and the one or more second building devices are a second plurality of building devices. In some embodiments, one building device of the first plurality of building devices is also a building device of the second plurality of building devices.

In some embodiments, the zone power mode is at least one of a conference call mode associated with one or more first configuration settings for the one or more first building devices and the one or more second building devices, a video presentation mode associated with one or more second configuration settings for the one or more first building devices and the one or more second building devices, a zone occupied mode associated with one or more third configuration settings for the one or more first building devices and the one or more second building devices or a zone unoccupied mode associated with one or more fourth configuration settings for the one or more first building devices and the one or more second building devices.

In some embodiments, the one or more computer-readable storage media store a device inventory of the zone, wherein the device inventory indicates the one or more first building devices and the one or more second building devices. In some embodiments, the instructions cause the one or more processors to operate the wireless power transmitter to switch from transmitting the wireless power to the one or more first building devices to transmitting the wireless power to the one or more second building devices based on the indication of the zone power mode and the device inventory.

In some embodiments, the instructions cause the one or more processors to cause the wireless power transmitter to communicate with the one or more first building devices and the one or more second building devices and receive a plurality of indications, each of the plurality of indications indicating one building device of the one or more first building devices and the one or more second building devices and generate the device inventory based on the plurality of indications.

Another implementation of the present disclosure is a building management system of a building including one or more computer-readable storage media having instructions stored thereon that, when executed by one or more processors, cause the one or more processors to receive one or more data structures visually indicating an area of the building, wherein one or more building devices are located within the area of the building. The instructions cause the one or more processors to receive, from a wireless power system wirelessly providing power to the one or more building devices, charging information for each of the one or more building devices, generate an interface indicating a location of each of the one or more building devices within the area of the building and the charging information for each of the one or more building devices, and cause a display device of a user device to display the interface.

In some embodiments, the one or more data structures are data structures of a three dimensional (3D) building model including representations of walls, floors, or zones of the building.

In some embodiments, the instructions cause the one or more processors to receive the location of each of the one or more building devices from a tracking system, wherein the tracking system is at least one of the wireless power system, a millimeter wave cellular network tracking system, a global positioning system, or a router triangulation system.

In some embodiments, the instructions cause the one or more processors to receive the one or more data structures from a virtual reality device including a camera, wherein the one or more data structures are each an image captured by the camera of the virtual reality device.

In some embodiments, the one or more data structures are a building information model (BIM).

In some embodiments, the instructions cause the one or more processors to update the one or more data structures to include the location of each of the one or more building devices and control at least one of the one or more building devices based on the one or more data structures.

In some embodiments, the instructions cause the one or more processors to receive an indication of a user device location of a user device receiving power from wireless power system, receive a navigation destination of a user associated with the user device, generate one or more navigation directions based on the indication of the location of the user device and the navigation destination, and cause the display device of the user device to display the one or more navigation directions.

In some embodiments, the instructions cause the one or more processors to cause the wireless power system to perform one or more power transmissions to the user device, wherein the user device is associated with a user, determine, based on the one or more power transmissions, a user device location of the user device, determine whether the user device location of the user device is within a defined area of the building and determine whether the user is assigned one or more privileges, and operate one or more pieces of building equipment associated with the defined area of the building in response to a first determination that the user device location of the user is within the defined area and in response to a second determination that the user is assigned the one or more privileges.

In some embodiments, the instructions cause the one or more processors to determine whether the user is restricted from entering the defined area of the building and generate an intrusion alert in response to a determination that the user is restricted from entering the defined area of the building.

In some embodiments, the instructions cause the one or more processors to cause the wireless power system to transmit power signals in a plurality of directions, determine one or more reflections of the power signals, determine whether the one or more reflections are caused by a weapon by analyzing the one or more reflections, and generate a notification in response to a determination that the one or more reflections are cause by the weapon.

Another implementation of the present disclosure is a building management system of a building including a power transmitter configured to transmit wireless power to a plurality of devices of the building, the plurality of devices including a first device and a second building device and one or more computer-readable storage media having instructions stored thereon that, when executed by one or more processors cause the one or more processors to receive building data from the first device and cause the power transmitter to communicate the building data to the second building device of the building.

In some embodiments, the power transmitter, the one or more computer-readable storage media, and the one or more processors are contained within an enclosure.

In some embodiments, the power transmitter is located remote from the one or more computer-readable storage media and the one or more processors.

In some embodiments, the first device is a technician device of a technician, wherein the building data is configuration data for the second building device.

In some embodiments, the instructions cause the one or more processors to receive second building data from the second building device via the power transmitter and communicate the second building data to the first device.

In some embodiments, the instructions cause the one or more processors to receive load data of the power transmitter, perform an optimization to determine a power allocation for each of the power transmitter and a plurality of other pieces of building equipment, and cause the power transmitter to transmit the wireless power to the plurality of devices of the building based on the power allocation for the power transmitter.

In some embodiments, the building data includes one or more test commands causing the second building device to perform one or more operations and generate test result data, wherein the second building data includes the test result data.

In some embodiments, the first device is a user device associated with a user and the building data is a temperature setpoint selected by the user via the user device. In some embodiments, the second building device is a thermostat configured to operate based on the temperature setpoint.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 9 is a flowchart of a first process of ordering devices in a prioritized list based on user priority, according to an exemplary embodiment.

FIG. 10 is a flowchart of a second process of ordering devices in a prioritized list based on a space mode, according to an exemplary embodiment.

FIG. 11 is a flowchart of a third process of ordering devices in a prioritized list based on job predictions for the devices, according to an exemplary embodiment.

FIG. 12 is a flowchart of a fourth process for ordering devices in a prioritized list based on risk levels of the devices, according to an exemplary embodiment.

FIG. 21 is an illustration of voice-activated wireless charging, according to an exemplary embodiment.

DETAILED DESCRIPTION

Referring generally to the FIGURES, systems and methods for wireless power in a building management system (BMS) or unified building management system (UBMS) are shown, according to various exemplary embodiments. Wireless power systems may be configured to be operable with building equipment and devices across domains like HVAC, fire, lighting, security, etc. The systems and methods shown in the FIGURES and described herein provide various functions and features that facilitate the use of wireless power technology to provide power to various devices while also exploiting wireless power technology to improve the operation of building systems.

Figure 1A:
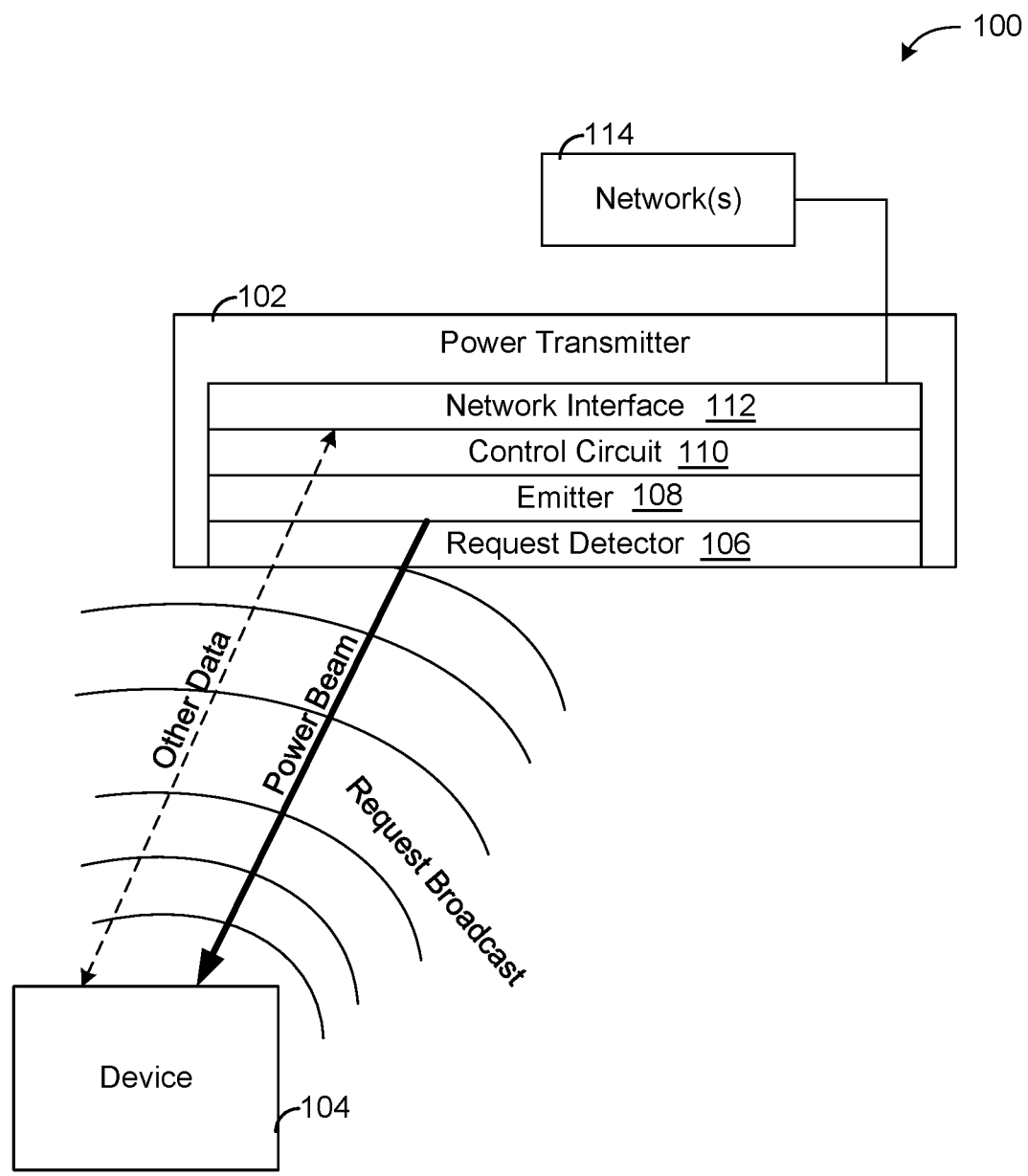
FIG. 1A is a diagram of a wireless power system including a power transmitter, according to an exemplary embodiment.

Referring now to FIG. 1A, a diagram of a wireless power system 100 is shown, according to an exemplary embodiment. As shown in FIG. 1A, the wireless power system 100 includes a power transmitter 102 and a device 104. The device 104 may be an electrically-powered device or collection of devices, including, among many other possible examples, personal computing devices (e.g., smartphones, tablets, personal computers, wearables), light fixtures, HVAC equipment and devices (e.g., VAV boxes, VRF indoor units, fans, thermostats, temperature sensors), fire safety devices (e.g., smoke detectors, pull stations, strobe lights, alarms), security cameras, access control devices (door locks, keys), various sensors, various appliances (e.g., kitchen appliances, bathroom fixtures/dispensers, televisions, projectors), specialized equipment (e.g., medical devices, surgical systems, warehouse devices), etc. In the wireless power system 100, devices that traditionally rely on local battery power and/or wired power connections need no longer do so, such that any such devices may be designed to consume more power while providing more functionality than traditional versions of such devices. Although FIG. 1A shows one power transmitter 102 and one device for the sake of clarity, it should be understood that in various embodiments, any number of devices and power transmitters may be included.

The device 104 is configured to broadcast a request for power from the power transmitter 102 and to receive a transmission of power in response. The device 104 may generate the broadcast request constantly, when the device reaches a threshold charge level (e.g., a minimum desired charge), when the device 104 detects that it is within range of a power transmitter 102, or some combination thereof. The broadcast request may be sent with a high frequency (e.g., many times per second) to facilitate real-time tracking of the device as described below.

The power transmitter 102 includes a request detector 106, an emitter 108, a control circuit 110, and a network interface 112. The control circuit 110 is configured to provide memory and processing resources configured to control the functions attributed herein to the power transmitter. The request detector 106 is configured to receive the request broadcast from the device 104 and detect the direction that the request broadcast came from (e.g., an angle relative to a normal vector that defines a surface of the power transmitter), for example by detecting the angle(s) of incidence of the request broadcast on the power transmitter 102. Some and/or all of the operations and/or control decisions, determinations, and/or identifications performed by the power transmitter 102 can be implemented as instructions stored on memory devices (e.g., non-transitory storage media, transitory storage media) and executed on one or multiple processors. The memory devices and/or processors can be included within the power transmitter 102 with other components of the power transmitter 102 within an enclosure. Examples of memory devices, processors, and/or processing circuitry that can implement the operations of the power transmitter 102 are provided in FIG. 1B, i.e., processing circuit 154, processor 156, and memory 158.

In response to receiving a request broadcast from the device 104 at a particular angle, the emitter 108 is configured to form a power beam and aim the power beam along that particular angle. The emitter 108 thereby directs the power beam to the device along an unobstructed transmission path (e.g., not through human mass). The transmission path may be a straight line between the emitter 108 and the device 104 and/or may reflect of one or more walls or other surfaces. The power transmitter 102 may collect information relating to transmission path(s) for use in determining the location of devices in a space or place, for example as described in detail below.

The power beam provides a radio-frequency oscillating electrical field at the device. For example, the power beam may have a frequency of 2.4 gigahertz (similar to Wi-Fi networks). The power beam transmission may therefore be no more dangerous that existing Wi-Fi networks. The device 104 includes a receiver configured to transform the electromagnetic field created by the power beam into electrical energy that can be stored in a battery of the device and/or consumed by the device 104 to allow the device to function.

As shown in FIG. 1A, other data may also be transmitted between the power transmitter 102 and the device 104. This data may include control signals for the device 104, status information about the device 104, data measured/collected by the device, emergency communications, configuration or commissioning files, etc. Various such embodiments are shown in the FIGURES and described in detail below. In some embodiments, an encrypted and/or otherwise secure communication channel may be established between the device 104 and the power transmitter 102 to ensure security of data transmitted between the device 104 and the power transmitter 102 and vice versa.

The power transmitter 102 may be communicably and operably coupled to a network 114 via the network interface 112. The network 114 provides communication between the power transmitter 102 and one or more other systems, devices, controllers, etc. The network 114 may be the Internet. In such a case, the power transmitter may be communicable with a cloud processing service that provides various advanced features, data analysis, analytics, etc., some examples of which are described below. In some embodiments, the device 104 may access the internet via the power transmitter 102. In some embodiments, the network 114 is a building automation network (e.g., BACnet) that facilitates communication between the power transmitter, the device, and/or building equipment, controllers, building management systems, etc. The network interface 112 may be configured to provide secure and/or encrypted communications over the network 114.

Figure 1B:
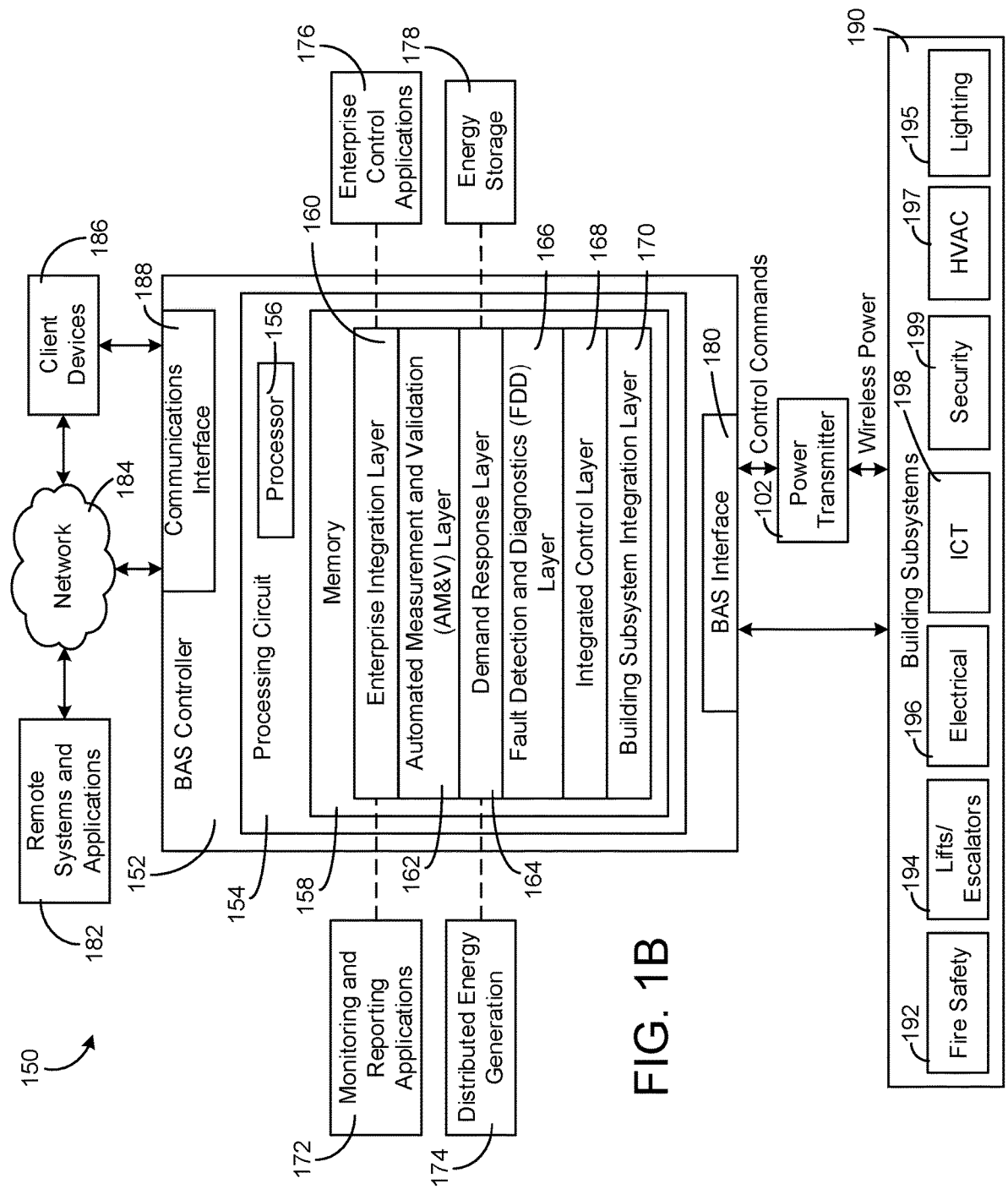
FIG. 1B is a block diagram of a building automation system (BAS) configured to monitor, control, and/or power building equipment via the power transmitter of FIG. 1A, according to an exemplary embodiment.

Referring now to FIG. 1B, a block diagram of a building automation system (BAS) 150 (also referred to as a building management system (BMS)) is shown, according to an exemplary embodiment. The BAS 150 can be implemented in a building to automatically monitor and control various building functions. The BAS 150 is shown to include a BAS controller 152 and a plurality of building subsystems 190. The building subsystems 190 are shown to include a building electrical subsystem 196, an information communication technology (ICT) subsystem 198, a security subsystem 199, a HVAC subsystem 197, a lighting subsystem 195, a lift/escalators subsystem 194, and a fire safety subsystem 192. In various embodiments, the building subsystems 190 can include fewer, additional, or alternative subsystems. For example, the building subsystems 190 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a building. In some embodiments, the building subsystems 190 include a waterside system and/or an airside system 300.

Each of the building subsystems 190 can include any number of devices, controllers, and connections for completing its individual functions and control activities. For example, the HVAC subsystem 197 can include a chiller, a boiler, any number of air handling units, economizers, field controllers, supervisory controllers, actuators, temperature sensors, and other devices for controlling the temperature, humidity, airflow, or other variable conditions within a building. The lighting subsystem 195 can include any number of light fixtures, ballasts, lighting sensors, dimmers, or other devices configured to controllably adjust the amount of light provided to a building space. The security subsystem 199 can include occupancy sensors, video surveillance cameras, digital video recorders, video processing servers, intrusion detection devices, access control devices and servers, or other security-related devices.

Still referring to FIG. 1B, the BAS controller 152 is shown to include a communications interface 188 and a BAS interface 180. The interface 188 can facilitate communications between the BAS controller 152 and external applications (e.g., monitoring and reporting applications 172, enterprise control applications 176, remote systems and applications 182, applications residing on client devices 186, etc.) for allowing user control, monitoring, and adjustment to the BAS controller 152 and/or the subsystems 190. The interface 188 can also facilitate communications between the BAS controller 152 and the client devices 186. The BAS interface 180 can facilitate communications between the BAS controller 152 and the building subsystems 190 (e.g., HVAC, lighting security, lifts, power distribution, business, etc.).

The interfaces 188 and 180 can be or include wired or wireless communications interfaces (e.g., jacks, antennas, transmitters, receivers, transceivers, wire terminals, etc.) for conducting data communications with the building subsystems 190 or other external systems or devices. In various embodiments, communications via the interfaces 188 and 180 can be direct (e.g., local wired or wireless communications) or via a communications network 184 (e.g., a WAN, the Internet, a cellular network, etc.). For example, the interfaces 188 and 180 can include an Ethernet card and port for sending and receiving data via an Ethernet-based communications link or network. In another example, the interfaces 188 and 180 can include a Wi-Fi transceiver for communicating via a wireless communications network. In another example, one or both of the interfaces 188 and 180 can include cellular or mobile phone communications transceivers. In one embodiment, communications interface 188 is a power line communications interface and BAS interface 180 is an Ethernet interface. In other embodiments, both the communications interface 188 and the BAS interface 180 are Ethernet interfaces or are the same Ethernet interface.

Still referring to FIG. 1B, the BAS controller 152 is shown to include a processing circuit 154 including a processor 156 and memory 158. The processing circuit 154 can be communicably connected to the BAS interface 180 and/or the communications interface 188 such that the processing circuit 154 and the various components thereof can send and receive data via the interfaces 188 and 180. The processor 156 can be implemented as a general purpose processor, an application specific integrated circuit (ASIC), one or more field programmable gate arrays (FPGAs), a group of processing components, or other suitable electronic processing components.

The memory 158 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 158 can be or include volatile memory or non-volatile memory. The memory 158 can include database components, object code components, script components, or any other type of information structure for supporting the various activities and information structures described in the present application. According to an exemplary embodiment, the memory 158 is communicably connected to the processor 156 via the processing circuit 154 and includes computer code for executing (e.g., by the processing circuit 154 and/or the processor 156) one or more processes described herein.

Figure 4:
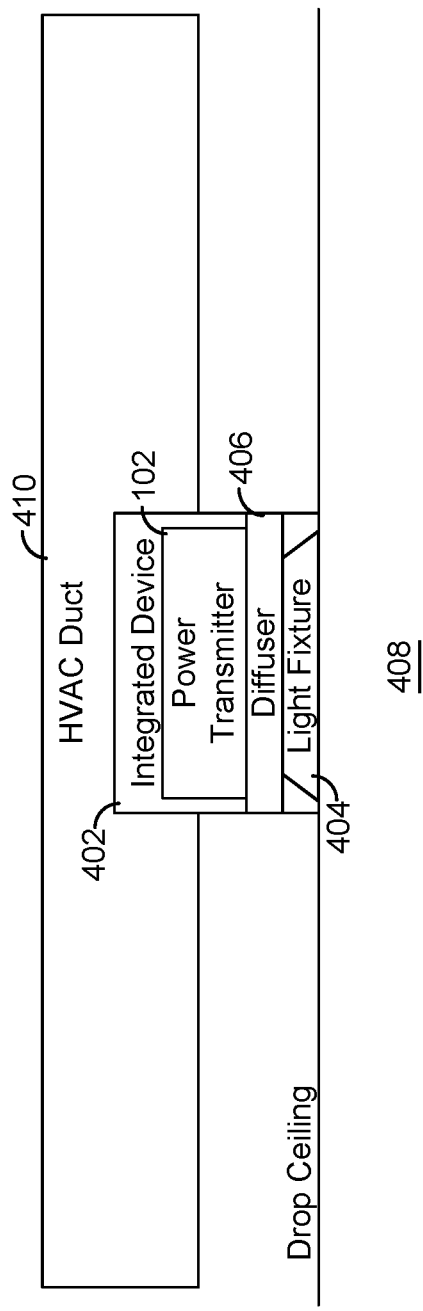
FIG. 4 is a block diagram of an integrated device that includes the power transmitter of FIG. 1A, a light fixture, and a diffuser, according to an exemplary embodiment.

In some embodiments, the BAS controller 152 is implemented within a single computer (e.g., one server, one housing, etc.). In various other embodiments BAS controller 152 can be distributed across multiple servers or computers (e.g., that can exist in distributed locations). Further, while FIG. 4 shows the applications 172 and 176 as existing outside of the BAS controller 152, in some embodiments, the applications 172 and 176 can be hosted within the BAS controller 152 (e.g., within the memory 158).

Still referring to FIG. 1B, the memory 158 is shown to include an enterprise integration layer 160, an automated measurement and validation (AM&V) layer 162, a demand response (DR) layer 164, a fault detection and diagnostics (FDD) layer 166, an integrated control layer 168, and a building subsystem integration later 170. The layers 160-170 can be configured to receive inputs from the building subsystems 190 and other data sources, determine optimal control actions for the building subsystems 190 based on the inputs, generate control signals based on the optimal control actions, and provide the generated control signals to the building subsystems 190. The following paragraphs describe some of the general functions performed by each of the layers 160-170 in BAS 150.

The enterprise integration layer 160 can be configured to serve clients or local applications with information and services to support a variety of enterprise-level applications. For example, the enterprise control applications 176 can be configured to provide subsystem-spanning control to a graphical user interface (GUI) or to any number of enterprise-level business applications (e.g., accounting systems, user identification systems, etc.). The enterprise control applications 176 can also or alternatively be configured to provide configuration GUIs for configuring the BAS controller 152. In yet other embodiments, the enterprise control applications 176 can work with the layers 160-170 to optimize building performance (e.g., efficiency, energy use, comfort, or safety) based on inputs received at the interface 188 and/or the BAS interface 180.

The building subsystem integration layer 170 can be configured to manage communications between the BAS controller 152 and the building subsystems 190. For example, the building subsystem integration layer 170 can receive sensor data and input signals from the building subsystems 190 and provide output data and control signals to the building subsystems 190. The building subsystem integration layer 170 can also be configured to manage communications between the building subsystems 190. The building subsystem integration layer 170 translates communications (e.g., sensor data, input signals, output signals, etc.) across a plurality of multi-vendor/multi-protocol systems.

The demand response layer 164 can be configured to optimize resource usage (e.g., electricity use, natural gas use, water use, etc.) and/or the monetary cost of such resource usage in response to satisfy the demand of a building. The optimization can be based on time-of-use prices, curtailment signals, energy availability, or other data received from utility providers, distributed energy generation systems 174, from energy storage 178 (e.g., hot thermal energy storage (TES), cold TES, etc.), or from other sources. The demand response layer 164 can receive inputs from other layers of the BAS controller 152 (e.g., the building subsystem integration layer 170, the integrated control layer 168, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 164 includes control logic for responding to the data and signals it receives. These responses can include communicating with the control algorithms in the integrated control layer 168, changing control strategies, changing setpoints, or activating/deactivating building equipment or subsystems in a controlled manner. The demand response layer 164 can also include control logic configured to determine when to utilize stored energy. For example, the demand response layer 164 can determine to begin using energy from the energy storage 178 just prior to the beginning of a peak use hour.

In some embodiments, the demand response layer 164 includes a control module configured to actively initiate control actions (e.g., automatically changing setpoints) which minimize energy costs based on one or more inputs representative of or based on demand (e.g., price, a curtailment signal, a demand level, etc.). In some embodiments, the demand response layer 164 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

The demand response layer 164 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

The integrated control layer 168 can be configured to use the data input or output of the building subsystem integration layer 170 and/or the demand response later 164 to make control decisions. Due to the subsystem integration provided by building subsystem integration layer 170, integrated control layer 168 can integrate control activities of the subsystems 190 such that the subsystems 190 behave as a single integrated supersystem. In an exemplary embodiment, the integrated control layer 168 includes control logic that uses inputs and outputs from a plurality of building subsystems to provide greater comfort and energy savings relative to the comfort and energy savings that separate subsystems could provide alone. For example, the integrated control layer 168 can be configured to use an input from a first subsystem to make an energy-saving control decision for a second subsystem. Results of these decisions can be communicated back to the building subsystem integration layer 170.

The integrated control layer 168 is shown to be logically below demand response layer 164. The integrated control layer 168 can be configured to enhance the effectiveness of the demand response layer 164 by enabling the building subsystems 190 and their respective control loops to be controlled in coordination with the demand response layer 164. This configuration can reduce disruptive demand response behavior relative to conventional systems. For example, the integrated control layer 168 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

The integrated control layer 168 can be configured to provide feedback to the demand response layer 164 so that the demand response layer 164 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. The integrated control layer 168 is also logically below fault detection and the diagnostics layer 166 and automated measurement and the validation layer 162. The integrated control layer 168 can be configured to provide calculated inputs (e.g., aggregations) to these higher levels based on outputs from more than one building subsystem.

The automated measurement and validation (AM&V) layer 162 can be configured to verify that control strategies commanded by the integrated control layer 168 or demand response layer 164 are working properly (e.g., using data aggregated by the AM&V layer 162, the integrated control layer 168, the building subsystem integration layer 170, the FDD layer 166, or otherwise). The calculations made by the AM&V layer 162 can be based on building system energy models and/or equipment models for individual BAS devices or subsystems. For example, the AM&V layer 162 can compare a model-predicted output with an actual output from building subsystems 190 to determine an accuracy of the model.

The fault detection and diagnostics (FDD) layer 166 can be configured to provide on-going fault detection for the building subsystems 190, building subsystem devices (i.e., building equipment), and the control algorithms used by demand response layer 164 and integrated control layer 168. The FDD layer 166 can receive data inputs from the integrated control layer 168, directly from one or more building subsystems or devices, or from another data source. The FDD layer 166 can automatically diagnose and respond to detected faults. The responses to detected or diagnosed faults can include providing an alarm message to a user, a maintenance scheduling system, or a control algorithm configured to attempt to repair the fault or to work-around the fault.

The FDD layer 166 can be configured to output a specific identification of the faulty component or cause of the fault (e.g., loose damper linkage) using detailed subsystem inputs available at the building subsystem integration layer 170. In other exemplary embodiments, The FDD layer 166 is configured to provide "fault" events to the integrated control layer 168 which executes control strategies and policies in response to the received fault events. According to an exemplary embodiment, the FDD layer 166 (or a policy executed by an integrated control engine or business rules engine) can shut-down systems or direct control activities around faulty devices or systems to reduce energy waste, extend equipment life, or assure proper control response.

The FDD layer 166 can be configured to store or access a variety of different system data stores (or data points for live data). The FDD layer 166 can use some content of the data stores to identify faults at the equipment level (e.g., specific chiller, specific AHU, specific terminal unit, etc.) and other content to identify faults at component or subsystem levels. For example, the building subsystems 190 can generate temporal (i.e., time-series) data indicating the performance of the BAS 150 and the various components thereof. The data generated by the building subsystems 190 can include measured or calculated values that exhibit statistical characteristics and provide information about how the corresponding system or process (e.g., a temperature control process, a flow control process, etc.) is performing in terms of error from its setpoint. These processes can be examined by the FDD layer 166 to expose when the system begins to degrade in performance and alarm a user to repair the fault before it becomes more severe.

The BAS controller 152 can integrate with the power transmitter 102 (or multiple other power transmitters of a building). In this regard, the control of the power transmitter 102 and/or of multiple power transmitters similar to the power transmitter 102 can be centralized and performed by the BAS controller 152. In this regard, the power transmitter 102 can be integrated into a building automation system, e.g., the BAS 150. In some embodiments, all of the determinations or operations of the power transmitter 102 are performed by the BAS controller 152, i.e., the BAS controller 152 controls the power transmitter 102 based on information passed to the BAS controller 152 from the power transmitter 102. For example, all of the operations performed by the power transmitter 102 can, in some embodiments, be performed by the processing circuit 154 of the BAS controller 152. However, in some embodiments, some and/or all of the operations are performed by the power transmitter 102 itself. In some embodiments, the operations are distributed between the BAS controller 152 and the power transmitter 102.

The power transmitter 102 is shown to communicate with the BAS controller 152 via the BAS interface 180. However, in some embodiments, the power transmitter 102 can communicate with the BAS controller 152 via the network 184 and the communications interface 188. Via the communications interface 188 and/or the power transmitter 102, the BAS controller 152 can receive data from the power transmitter 102 and operate the power transmitter 102 according to the received data.

For example, the BAS controller 152 can be configured, in some embodiments, to cause the power transmitter 102 to operate in different power modes, i.e., operate according to a zone charging profile where one or more particular devices of a zone are powered or charged according to a selected mode. Modes may include an occupied mode. In some occupied mode, when a user is detected within the zone, equipment of the zone are charged and/or power via the power transmitter 102 to provide a comfortable environment for the user, e.g., lighting systems may receive power in order to be powered, HVAC devices can be powered to provide a particular temperature setpoint, etc. Similarly, in an unoccupied mode, when no user is within the zone, the power transmitter 102 may reduce or stop powering the lighting devices and/or the HVAC devices. In some embodiments, the BAS controller 152 receives a selection of a zone charging mode or otherwise receives a selection of the mode from the power transmitter 102 and provides one or more control decisions to implement the appropriate mode to the power transmitter 102. Zone based charging modes are described in greater detail in FIG. 26.

In some embodiments, the BAS controller 152 stores an inventory of devices in each space (e.g., zone, floor, area, etc.) of the building. One or multiple zone mode templates may be stored by the BAS controller 152 and/or the power transmitter 102 indicating whether or not (or in what amount) certain types of devices of a zone should be provided power. Based on the charging settings for device types indicated by the zone mode template and the known devices located within the space identified by the inventory, the BAS controller 152 can determine which specific devices of the zone should receive power and communicate the control decision to the power transmitter 102. The device inventory is described in greater detail with reference to FIG. 31.

In some embodiments, the power transmitter 102, in addition to powering devices of the building subsystems 190, can pass messages between the devices of the building subsystems 190. For example, if a user cell phone (e.g., the client devices 186) is connected to the power transmitter 102 and is receiving power from the power transmitter 102, the user cell phone could transmit a temperature setpoint to the power transmitter 102 via a wireless signal. The power transmitter 102 can transmit the temperature setpoint to a thermostat also connected to the power transmitter 102 and being powered by the power transmitter 102. Examples of transmitting control data between devices by the power transmitter 102 is further described with reference to FIG. 14.

Furthermore, in some embodiments, the power transmitter 102 can configure or commission the devices of the building subsystems 190. For example, a configuration device, e.g., the BAS controller 152 and/or the client devices 186 which may or may not be powered by the power transmitter 102, can provide configuration/commissioning data to the power transmitter 102 which the power transmitter 102 can transmit the configuration/commissioning data to a device of the building subsystem 190 that the power transmitter 102 may be powering. Examples of configuration and/or commissioning is described in greater detail with reference to FIG. 32. Similarly, a testing device or circuit could communicate to the building subsystems 190 through the power transmitter 102. For example, the BAS controller 152 and/or the client devices 186 (which may or may not be powered via the power transmitter 102) can transmit testing commands for a device of the building subsystems 190 to the device through the power transmitter 102 and the wireless communication between the power transmitter 102 and the device of the building subsystems 190. Test result data generated by the device of the building subsystems 190 can be communicated back to the testing device through the wireless communication of the power transmitter 102. Device testing via the power transmitter 102 is described in greater detail with reference to FIG. 33.

In some embodiments, the BAS controller 152 can perform various power optimizations for the building subsystems 190 and/or central plants of a building (e.g., distributed energy generation 174, energy storage 178, etc.). In this regard, the optimizations performed by the BAS controller 152 can include identifying an amount of wireless power for the power transmitter 102 to distribute to the building subsystems 190. The amounts may be on a device level, i.e., particular amounts for each device of the building subsystems 190. In this regard, the power allocations determined by the BAS controller 152 can be transmitted to the power transmitter 102 and the power transmitter 102 can charge the building subsystems 190 based on the power allocations received from the BAS controller 152. Power optimization for the power transmitter 102 is further described with reference to FIG. 36.

In some embodiments, the BAS controller 152 can generate user interfaces based on data collected from the power transmitter 102. For example, the BAS controller 152 may store an indication of locations of the devices of the building subsystems 190. Furthermore, based on charging data collected for each device of the building subsystems 190 via the power transmitter 102, the BAS controller 152 can generate a visual building representation (e.g., a two dimensional map, a three dimensional map, an actual image for a virtual reality system, etc.) where the charging data is included as an overlay to the building representation. Examples of providing charging data on an interface are described in greater detail in FIG. 23 and FIG. 29. The locations of the devices of the building subsystems 190 may be known by the BAS controller 152 and can be manually input by a user, determined through 5G based communication with the controller 152, via a global positioning system (GPS) installed on the device of the building subsystems 190, via Wi-Fi router based triangulation, or via location detection performed directly by the power transmitter 102.

In some embodiments, the BAS controller 152 can perform location based system control through location detections performed by the power transmitter 102. For example, the power transmitter 102 may detect the presence of a user device in a particular area of a building. The location information of the user device can be communicated by the power transmitter 102 to the BAS controller 152. The BAS controller 152 may use an indication of the user device to determine whether a user associated with the user device has access to a specific location based function, e.g., whether the user can enter a particular location, utilize equipment of a particular space, etc. If the user does have access to the location based function, the BAS controller 152 can operate the building door to be unlocked, allow the user to control the equipment via the user device, etc. Details of user location determinations and access privileges is described in greater detail with reference to FIG. 27. In some embodiments, the BAS controller 152 can further determine whether the user device is at a location where the user associated with the user device is unauthorized to be in. In this regard, the BAS controller 152 can generate an alert and communicate the alert to an intrusion system. Further details of using the location detections of the power transmitter 102 for intrusion detection are described in greater detail with reference to FIG. 38.

In some embodiments, the BAS controller 152 can store building map data indicating floors, rooms, and/or other areas of a building. In this regard, if a user device is within a space of the building and communicates to the power transmitter 102, the location of the user device can be communicated to the BAS controller 152. The BAS controller 152, based on a destination location set for the user device and the current location of the user device determined by the power transmitter 102, can generate an interface, or interface data, indicating one or more navigation directions for navigating through the building to the destination location. Building navigation details are described in greater detail with reference to FIG. 34.

In some embodiments, the BAS controller 152 receives reflection data from the power transmitter 102. The reflection data can be analyzed by the BAS controller 152 to detect specific objects. For example, the reflection data may be indicative of the presence of a metal object such as a knife or gun that a user is in possession of. In this regard, the BAS controller 152 can generate alerts for security staff of a building and push the alerts to the security staff when a user is detected with a potential weapon. Details of weapon detection through wireless power communication is described in greater detail with reference to FIG. 39.

Figure 2:
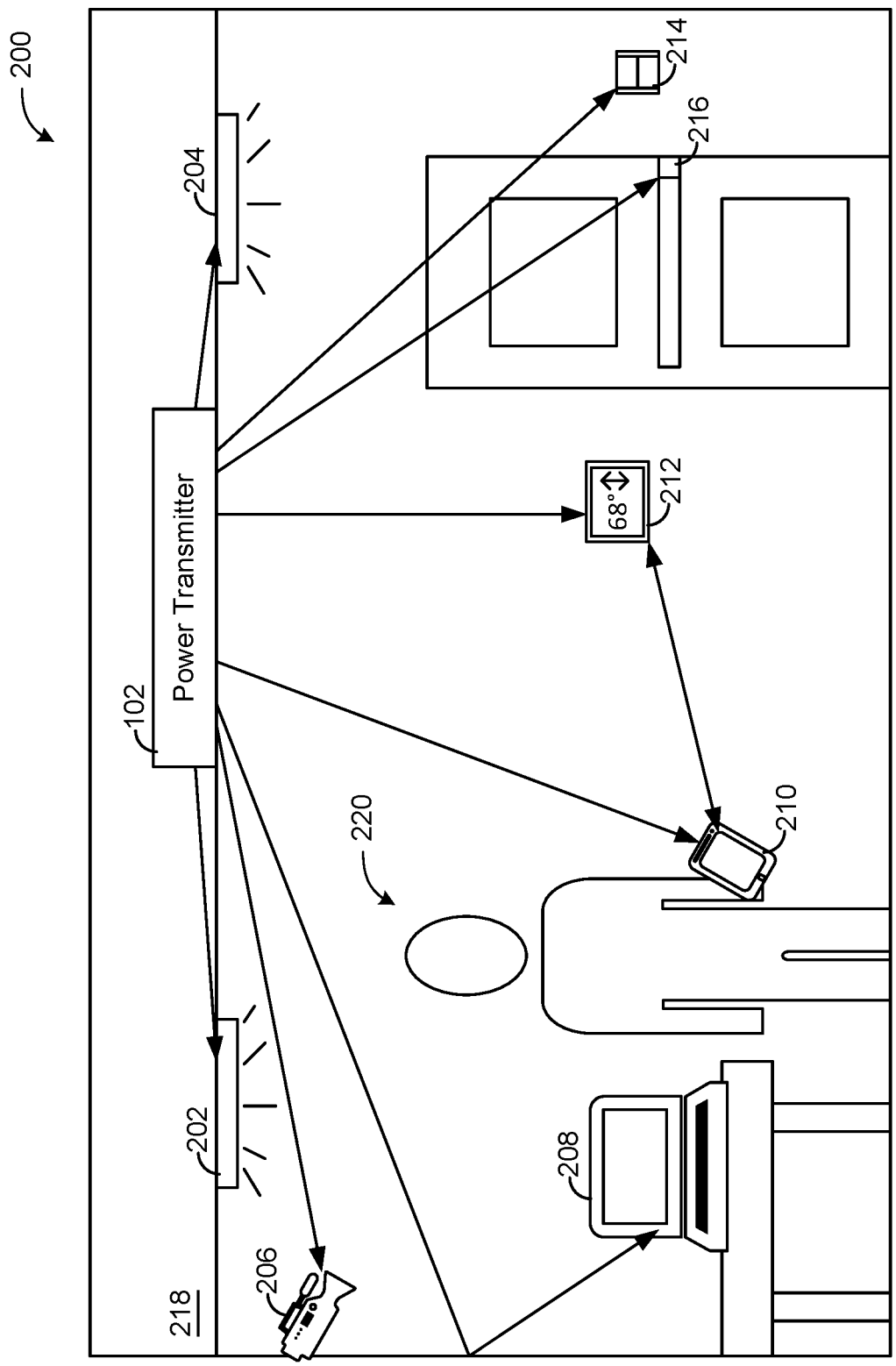
FIG. 2 is a schematic diagram of a space including the power transmitter of FIG. 1A that provides power to various devices in the space, according to an exemplary embodiment.

Referring now to FIG. 2, a space 200 having the power transmitter 102 that provides power to various devices 202-216 in the space 200 is shown, according to an exemplary embodiment. In the example shown, the power transmitter 102 transmits a power beam to a smartphone of a user device 210, a laptop 208, a security camera 206, two light fixtures 202 and 204, a fire pull station 214, a door lock 216, and a thermostat display device 212. It should be understood that these devices 202-216 are shown for example purposes and are not meant to be limiting. In the example of FIG. 2, the power transmitter 102 is located on or in a ceiling 218 of the space 200, for example integrated into a ceiling tile of the ceiling 218.

As illustrated by FIG. 2, the power beams take unobstructed transmission paths between the power transmitter 102 and each of the device 202-216. In FIG. 2, the direct line between the laptop 208 and the power transmitter 102 is blocked by a person 220, i.e., high-water-content human mass that is highly absorbent of request broadcasts from devices and power beams from the power transmitter 102. However, a request for power broadcast by the laptop 208 may still reach the power transmitter 102 by reflecting off a wall or other surface in the space. Because the power transmitter 102 directs the power beam back along the same path as the request broadcast, the power beam will also be reflected off of the wall or other surface to reach the laptop 208. This substantially ensures that the power beam is not directed into or through the human body. In some embodiments, the space 200 may be designed to have multiple surfaces that are highly reflective of power beams and request broadcasts. Because the wavelengths used for power transmission are far removed from the visible spectrum, surfaces may be made reflective in a relevant spectrum for power transmission without appearing reflective to the human eye.

As shown in FIG. 2, the power transmitter 102 is operable to provide power to both personal computing devices and to various devices across building domains. The power transmitter 102 thereby facilitates a space-centric understanding of space power that is independent of traditional divisions between different types of devices. The power transmitter 102 may thereby be particularly well-suited for use in a Unified Building Management System (UBMS), for example as described in U.S. Patent Application No. 62/636,504, filed Feb. 28, 2018, and/or for use with place profiles, space profiles, modes, etc. as described in detail in U.S. patent application Ser. No. 15/952,173, filed Apr. 12, 2018, both of which are incorporated by reference herein in their entireties. The power transmitter 102 may be controllable in accordance with a space profile in order to seamlessly control power supply across multiple building domains, for example to facilitate the efficient (e.g., cost-minimizing) use of power in the space 200. As one example, a space profile may guide the design of the space and the placement of the power transmitter 102 therein to maximize the unobstructed transmission of power to devices of all types. Various interactions between space profiles, modes, DBMS, etc. and the wireless power system are described in detail below with respect to various FIGURES.

As illustrated by FIG. 2, the various devices 202-216 across various building domains and types of devices may be located by the power transmitter 102 based on request broadcasts without pre-determined knowledge of identifiers of the devices 202-216, locations of the devices on various networks, etc. Accordingly, in some embodiments, the power transmitter 102 need not use or update a fully qualified reference to establish communication with a device, as the power transmitter 102 may simply direct power and/or other communications to a location in the space. Furthermore, the devices may broadcast their identities to the power transmitter 102. Accordingly, the wireless power system may simplify the naming, navigation, configuration, etc. of networks of building devices.

Also as illustrated in FIG. 2, in some embodiments two or more of the devices 202-216 may be configured to exchange power directly among themselves, i.e., without transmitting the power through the power transmitter 102. For example, this may facilitate balancing of power across devices, direction of power to high priority or critical devices. As another example, this may facilitate the transfer of power from a first device in a charging zone of a power transmitter (i.e., receiving power from a power transmitter 102) and a second device outside of the charging zone (i.e., not in range of a power transmitter), allowing devices to work as relays or nodes of a mesh network that allows power to be provided to devices outside of the range of a power transmitter. A power transmitter may manage said intra-device power transfers, for example by sending a command to a first device to provide power to a second device.

Figure 3:
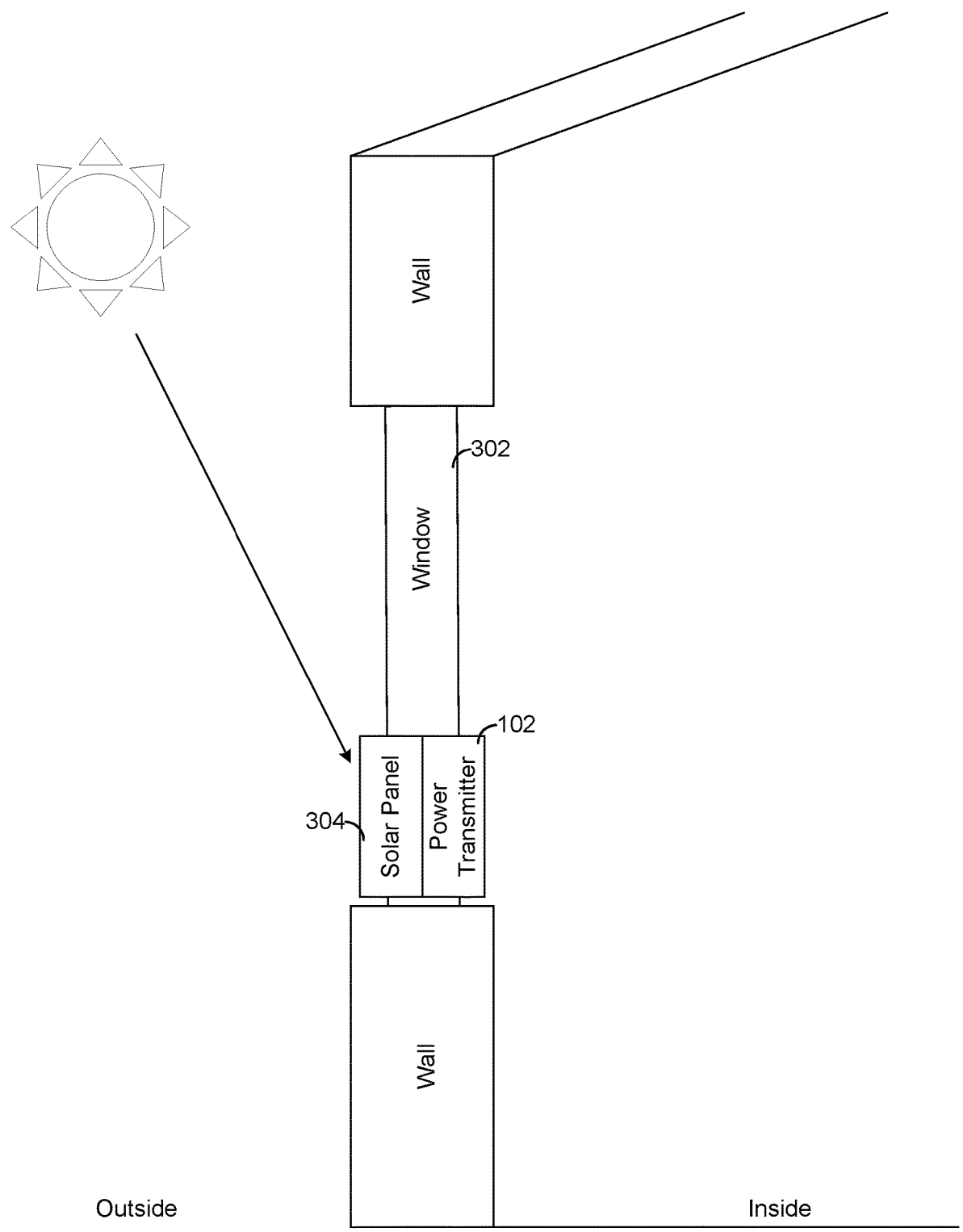
FIG. 3 is schematic diagram of the power transmitter of FIG. 1A at least partially powered by solar energy, according to an exemplary embodiment.

Referring now to FIG. 3, the power transmitter 102 at least partially powered by solar energy is shown, according to an exemplary embodiment. As shown in FIG. 3, the power transmitter 102 is mounted in a window 302 of an exterior wall of a building. Included with the power transmitter 102 is a solar panel 304, i.e., a collection of photovoltaic cells configured to transform solar radiation into electrical energy. The solar panel 304 provides electrical energy to the power transmitter 102, which transforms that electrical energy into power beams directed to particular devices in the building. In such a case, power is generated at the sun, transmitted wirelessly to the solar panel 304 and the power transmitter 102, and then transmitted wirelessly to various devices. Power may thereby be provided to devices without ever having been transmitted over space through a wire. In some embodiments, the power transmitter 102 is also connected to another source of energy (e.g., electrical grid) to supplement the energy collected by the solar panel 304.

Referring now to FIG. 4, an integrated device 402 that includes a power transmitter 102, a light fixture 404, and a diffuser 406 are shown. The power transmitter 102 may be used to provide/facilitate any of the functions described herein. The light fixture 404 may include a ceiling grid two-by-four or four-by-four format LED light fixture. The integrated device 402 can be integrated within an HVAC duct 410 which provides heated or cooled air from an HVAC system to a space 408 through the diffuser 406 of the integrated device 402. The diffuser 406 includes a damper configured to adjust, mix, direct, etc. airflow in the space 408, in some embodiments. In some embodiments, the integrated device 402 may include an airflow reading device, a lower power camera, a speaker, and/or a microphone. The integrated device 402 may include various circuitry to facilitate communication between the various elements thereof. The integrated device 402 may thereby provide various desirable features in a compact area of space while minimizing ceiling clutter. It should be understood that the space 408 may include multiple such integrated devices.

In some embodiments, the diffuser 406 is configured to minimize air currents flowing on humans, for example by directing air currents along power beam transmission paths. That is, because (as discussed with reference to FIG. 2) transmission paths do not intersect humans, air currents directed along those same paths may also not impact humans. Three-dimensional mapping of transmission paths, devices, spaces, people, etc. may further facilitate the interoperability between diffusers and power transmitters.

Figure 5:
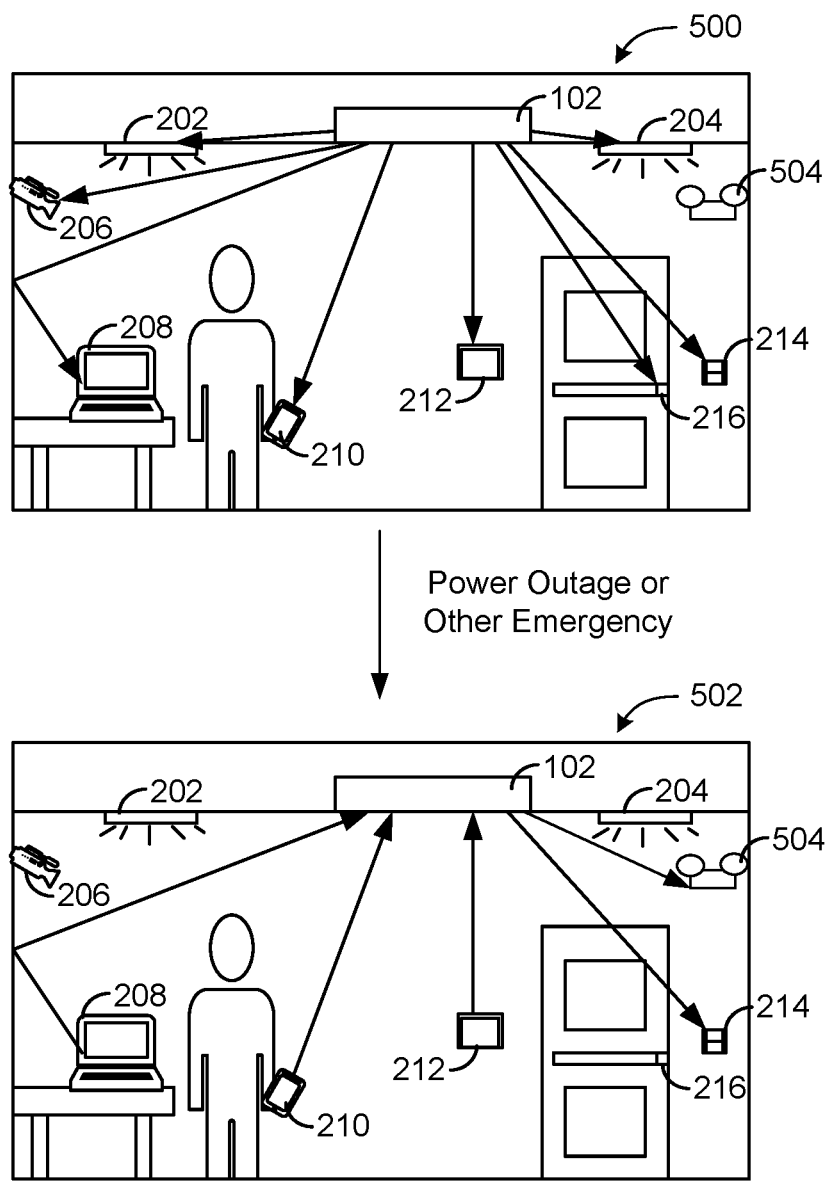
FIG. 5 is an illustration of a reversal of power transmission that the power transmitter of FIG. 1A is configured to perform, according to an exemplary embodiment.

Referring now to FIG. 5, an illustration of a reversal of power transmission is shown, according to an exemplary embodiment. In the first frame 500, power is transmitted to various devices 202-216 as described with reference to FIG. 2. A power outage or other emergency situation then occurs. In order to continue to power essential functions of the building, power transmission to non-essential devices may be reversed to return power to the power transmitter 102 as illustrated in the second frame 502 of FIG. 5. That is, devices such as the laptop 208, the user device 210 (e.g., a smartphone), and the thermostat display 212 may transmit power back to the power transmitter 102 for use in power essential devices such as emergency lighting and fire safety devices, e.g., emergency device 504. The building may thereby use energy stored in the batteries of various devices to continue to power some building devices in the case of a power outage or other emergency.

Figure 6:
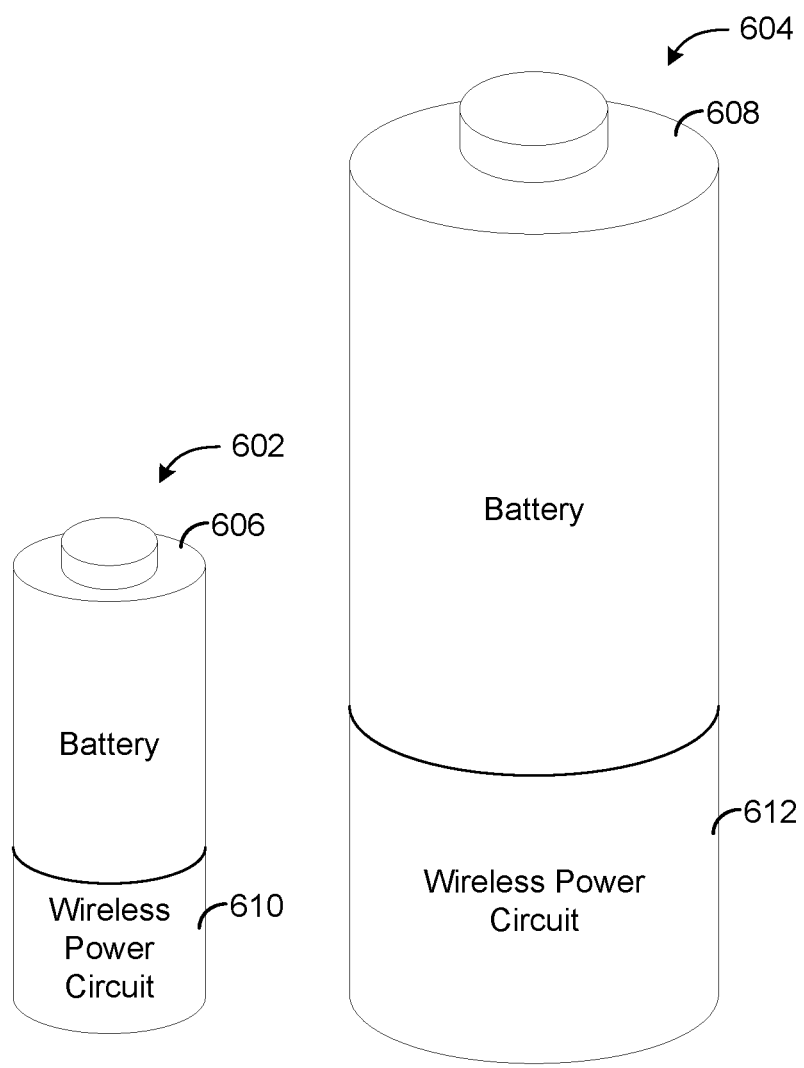
FIG. 6 is schematic diagram of wirelessly-chargeable batteries, according to exemplary embodiments.

Referring now to FIG. 6, wirelessly-chargeable batteries 602 and 604 are shown, according to exemplary embodiments. Each wirelessly-chargeable battery 602 and 604 includes a battery 606 and 608 respectively configured to store electrical energy. Each wirelessly-chargeable battery 602 and 604 each also include a wireless power circuit 610 or 612 respectively. The wireless power circuits 610 and 612 are configured to broadcast a request for power to a power transmitter, receive a power beam in response, and convert the electromagnetic field of the power beam into energy stored in the batteries 606 and 608 respectively.

FIG. 6 illustrates that the wirelessly-chargeable batteries 602 and 604 may be made in any of various standard sizes (e.g., AA, AAA, C, D) that may be installed in various devices to convert devices to wirelessly-chargeable devices without requiring redesign of the devices. The wirelessly-chargeable batteries 602 and 604 may also be produced in shapes, voltages, etc. suitable for installation in various smartphones, tablets, laptops, vehicles, etc. and/or connectable to such devices as accessories (e.g., as an external charging block, integrated into a case for a smartphone, etc.).

Figure 7:
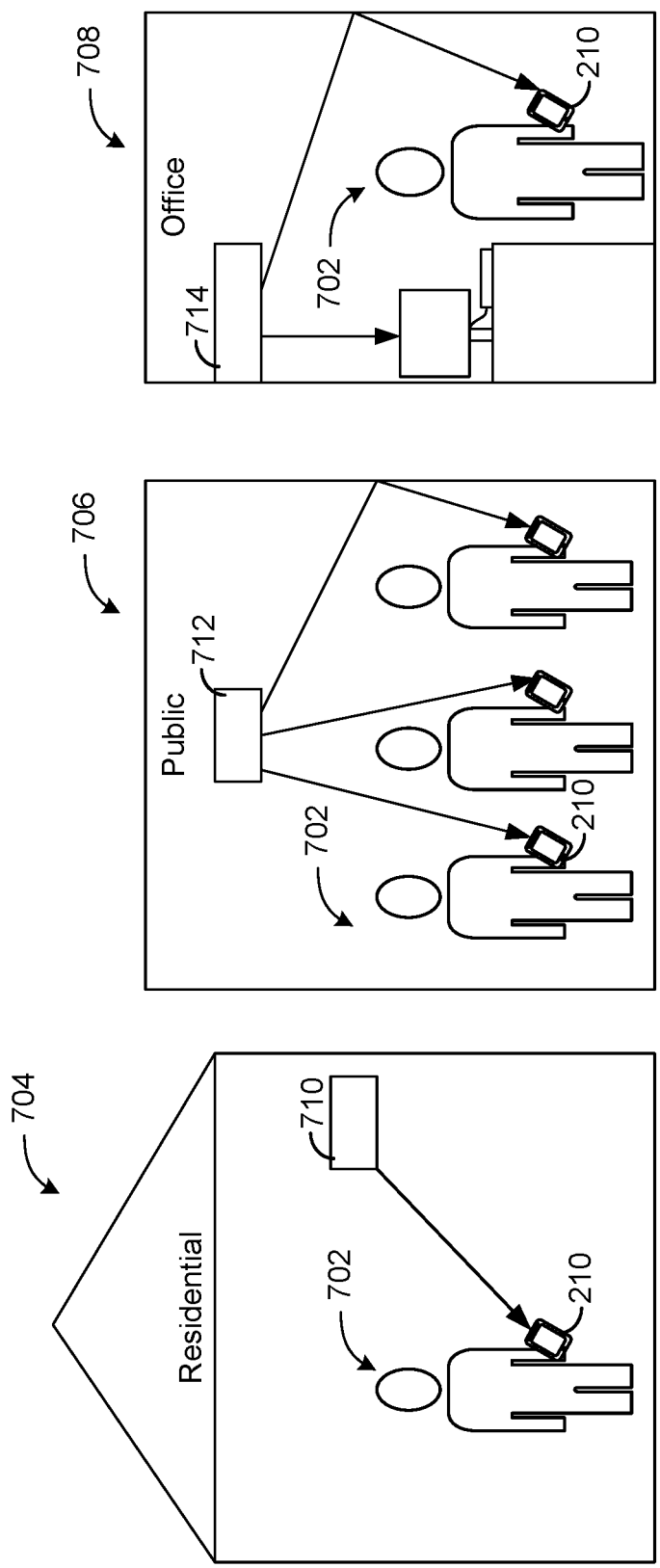
FIG. 7 is an illustration of a user moving from a residential setting to a public place and to an office setting while charging a smartphone wirelessly in all three settings, according to an exemplary embodiment.

Referring to FIG. 7, an illustration of a user 702 moving from a residential setting 704 to a public place 706 and to an office/work setting 708 while charging a smartphone wirelessly in all three settings is shown, according to an exemplary embodiment. FIG. 7 illustrates that devices may be made compatible with power transmitters (e.g., power transmitters 710, 712, and 714) that may be present in various types of locations, including power transmitters manufactured by various vendors. The power transmitters 710, 712, and 714 may be the same as or similar to the power transmitter 102 as described with reference to FIG. 1A. Accordingly, device 210 of user 702 may be charged wirelessly while the user is at home, while the user is in public (e.g., at a train station, in a train, on the sidewalk, on a bus, in a store, in a stadium, in a park, etc.), and while the user is at work. The risk of losing charge to a portable devices such as a smartphone may be eliminated or reduced.

Figure 8:
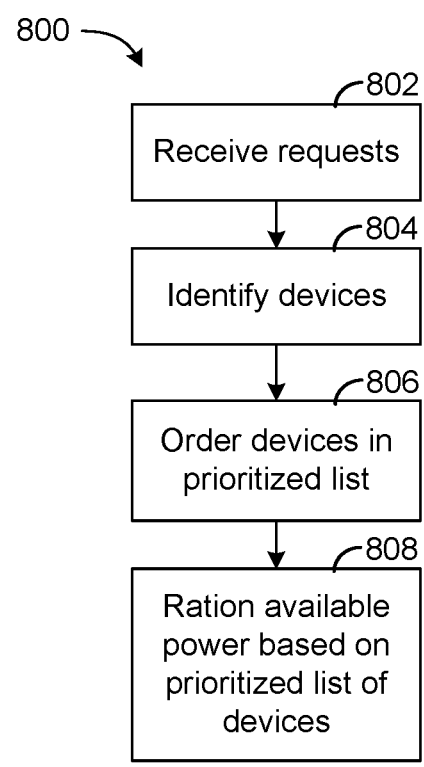
FIG. 8 is a flowchart of a process of rationing power by prioritizing devices, according to an exemplary embodiment.

Referring to FIG. 8, a flowchart of a process 800 of rationing power by prioritizing devices is shown, according to an exemplary embodiment. In some cases, the power transmitter 102 may not be capable of fulfilling all requests for power received by the power transmitter 102, and/or may choose to fulfill less than all requests for power in order to manage electrical load (e.g., to minimize utility costs). In such cases, the power transmitter 102 may follow the process of FIG. 8 to determine how much power to provide to which devices at a present or future time.

The power transmitter 102 receives requests for power from multiple devices (step 802). The power transmitter 102 identifies the devices, for example by receiving devices identities from the devices as part of the requests for power (step 804). The power transmitter 102 thereby creates an initial list of devices that are requesting power from the power transmitter 102. The power transmitter 102 then orders the devices in a prioritized list (step 806). Various processes for ordering devices in a prioritized list are shown in FIGS. 9-12 and are described in detail with reference thereto. The power transmitter 102 may then ration the available power based on the prioritized list of devices (step 808). For example, the power transmitter 102 may fulfill the requests starting with the highest-priority device and moving down the list until the available power is accounted for.

Referring now to FIG. 9, a flowchart of a first process 900 for ordering devices in a prioritized list is shown, according to an exemplary embodiment. In the process 900 of FIG. 9, each device is associated with a user (step 902). Users may be identified based on individual identifiers (e.g., name, ID number) and/or based on their roles in a space (e.g., presenter, conference attendee, surgeon, nurse, patient, customer). The users are then ordered in a prioritized list of users (step 904). In some embodiments, the users may be ordered based on the importance of their roles in a space relative to a job being done in the space (e.g., a presenter may be prioritized higher than a conference attendee while the presenter is presenting a presentation). In some embodiments, the users may be ordered based on a corporate or social hierarchy (e.g., the CEO is ranked higher than the intern). In the process 900 of FIG. 9, the prioritized list of devices may then be generated based on the prioritized list of users to prioritize the devices associated with the higher-priority users (step 906).

Referring now to FIG. 10, a flowchart of a second process 1000 for ordering devices in a prioritized list is shown, according to an exemplary embodiment. The process 1000 of FIG. 10 prioritizes devices based on a mode for the space. Mode-based control is described in detail in U.S. patent application Ser. No. 15/952,173, filed Apr. 12, 2018, incorporated by reference herein in its entirety. Under mode-based control, a mode is selected for a space that determines settings for the devices in the space (step 1002). FIG. 10 illustrates that a prioritized list of devices may be generated based on the required usage of the devices in the selected mode (step 1004). In some embodiments, a space profile and/or mode profile includes data that states which devices require more power in each mode. In some embodiments, a predefined prioritization of devices is included with each mode. In other embodiments, the power transmitter is configured to derive a usage-based prioritization of devices based on other control signals associated with the mode. The power transmitter may thereby be configured to provide power to the devices that most need it to execute an active mode for a space or place.

Figure 13:
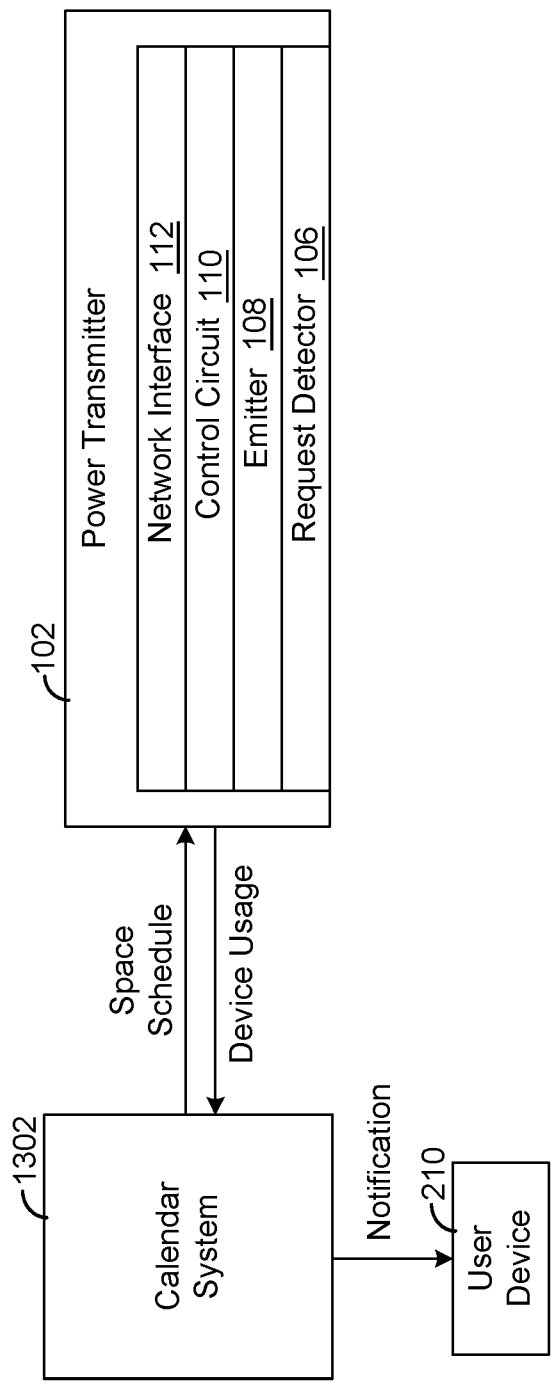
FIG. 13 is a block diagram of communication between a calendar system and the power transmitter of FIG. 1A, according to an exemplary embodiment.

Referring now to FIG. 11, a flowchart of a third process 1100 for ordering devices in a prioritized list is shown, according to an exemplary embodiment. Here, the power transmitter 102 predicts and/or receives an indication of future jobs to be done in the space (step 1102). For example, a calendaring system may provide a schedule of future events in the space to the power transmitter as shown in FIG. 13 and described in detail with reference thereto. As another example, the power transmitter 102 may use historical data to predict future jobs to be done in the space. The power transmitter 102 may then determine devices required for an upcoming job (step 1104). For example, the power transmitter 102 may store a look-up table that associates each known job with devices used for that job. A prioritized list of devices may then be generated based on which devices a required for an upcoming job (step 1106). This may facilitate the power transmitter 102 in pre-charging devices in anticipation of future demand.

Referring now to FIG. 12, a flowchart of a fourth process 1200 for ordering devices in a prioritized list is shown, according to an exemplary embodiment. In the process 1200 of FIG. 12, a risk level is associated with each device (step 1202). For example, fire safety devices may have a higher risk level than most lighting devices in a building. As another example, intrusion detection devices in areas more likely to experience attempted intrusions may be higher risk than intrusion detection devices in other areas. The devices may then ordered in a prioritized list based on risk level with higher-risk devices given higher priority (step 1204). This may minimize risk to a building by ensuring that the power transmitter(s) provide power first to high risk level devices.

Referring now to FIG. 13, a block diagram of communication between a calendar system 1302 and the power transmitter 102 is shown, according to an exemplary embodiment. The calendar system 1302 may include a room scheduling system (e.g., conference room scheduling, hotel room booking, patient room booking, operating room scheduling) and/or a personal calendar system.

In some embodiments, the calendar system 1302 provides a schedule for the space to the power transmitter. The power transmitter 102 may use the schedule to determine when to provide power to which devices, for example to pre-charge devices in advance of events that require usage of those devices in a way that minimizes utility costs (e.g., by minimizing a maximum demand charge). In some embodiments, the power transmitter 102 detects the time of usage of various devices in the room to determine actual start times of scheduled events. For example, the power transmitter 102 may detect that particular surgical equipment was not operated until one hour after a scheduled time to use that equipment. As another example, the power transmitter 102 may detect that lights and other devices in a conference room were turned off before a scheduled end of a meeting. As illustrated in FIG. 13, the power transmitter 102 may provide this device usage data to the calendar system 1302. The calendar system 1302 may notify a user of the deviation from the schedule, for example to notify a family member that a surgery started late or to provide an indication to a user that a conference room has become available via communication to a user device 210 of the user.

Figure 14:
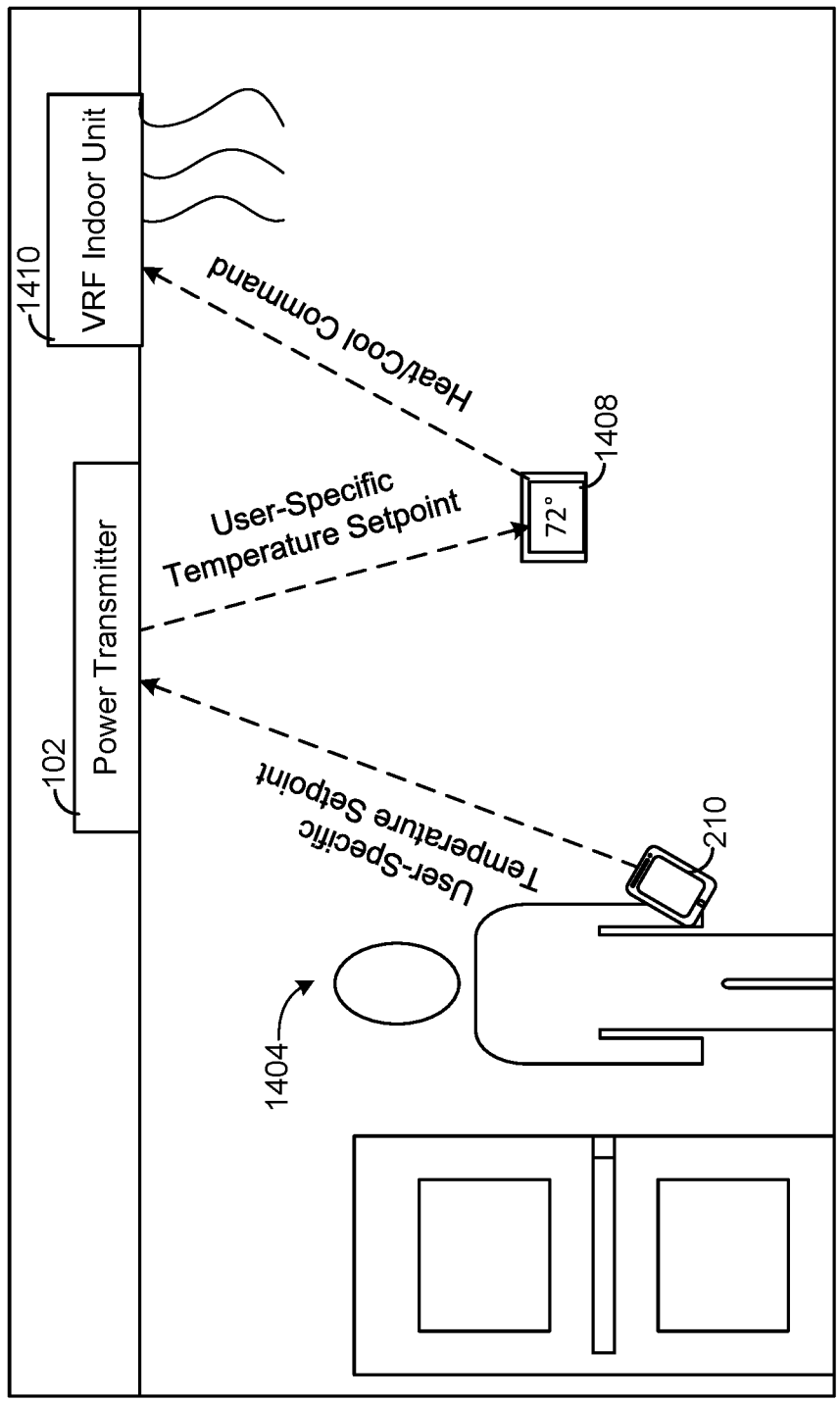
FIG. 14 is a block diagram of communication between devices via the power transmitter of FIG. 1A, according to an exemplary embodiment.

Referring now to FIG. 14, an illustration of communication between devices via the power transmitter 102 is shown, according to an exemplary embodiment. In the example shown, a user device 1402 of a user 1404 stores a user-specific temperature setpoint for a space (i.e., a temperature preferred by the particular user for that space). The user device 1402 transmits the user-specific temperature setpoint to the power transmitter 102 during power transmission. The power transmitter 102 then forwards the user-specific temperature setpoint to a thermostat 1408 in the space during power transmission to the thermostat 1408. The thermostat 1408 adjusts a temperature setpoint for the space based on the user-specific temperature setpoint and provides control signals to a heating/cooling system (shown as a variable refrigerant flow indoor unit 1410) to cause the temperature in the space to approach the user-specific temperature setpoint. The wireless charging system thereby facilitates automated adjustment of conditions in the space to match a particular preferences of a user.

Figure 15:
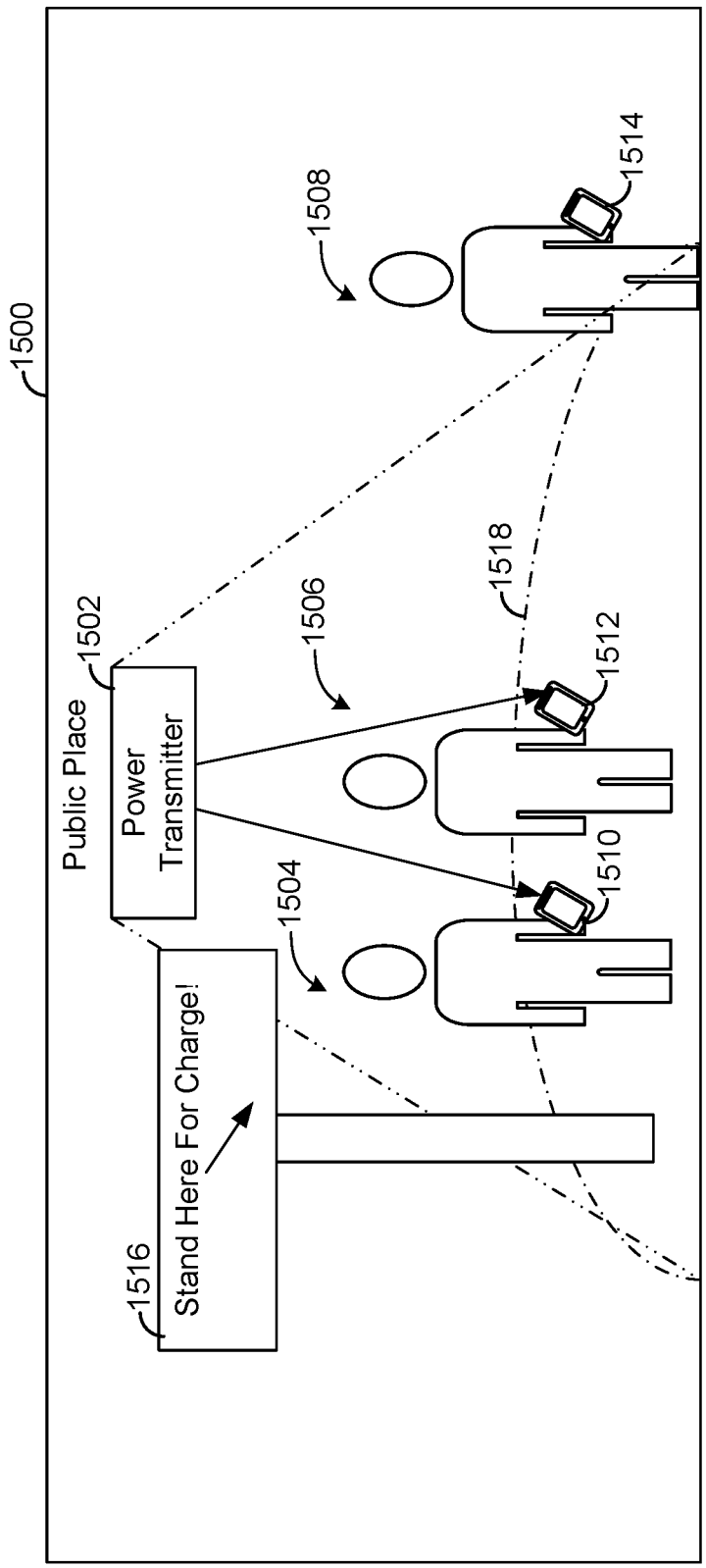
FIG. 15 is a block diagram of a public wireless power transmission station, according to an exemplary embodiment.

Referring now to FIG. 15, a public wireless power transmission station 1502 is shown, according to an exemplary embodiment. The wireless power transmission station 1502 may be located in a public space 1500, for example in an airport, train station, shopping mall, etc. where people (e.g., users 1504, 1506, and 1508) often desire a way to charge their personal computing devices, e.g., user devices 1510, 1512, and 1514 respectively. As shown in FIG. 15, the wireless power transmission station 1502 includes a sign 1516 that indicates where to stand to receive power. As illustrated in FIG. 15, power may be transmitted wireless from the wireless power transmission station 1502 to devices 1510 and 1512 within a charging zone, but not to devices outside of the charging zone (e.g., the user device 1514). A boundary 1518 may be drawn on a floor or otherwise indicated (e.g., by a fence) that denotes the boundary of the charging zone within which power may be received. In some embodiments, the charging zone is a room or other restricted area within a public space for which admission may be monitored or metered. FIGS. 17-20 provide further details of possible implementations associated with a wireless power transmission station.

Figure 16:
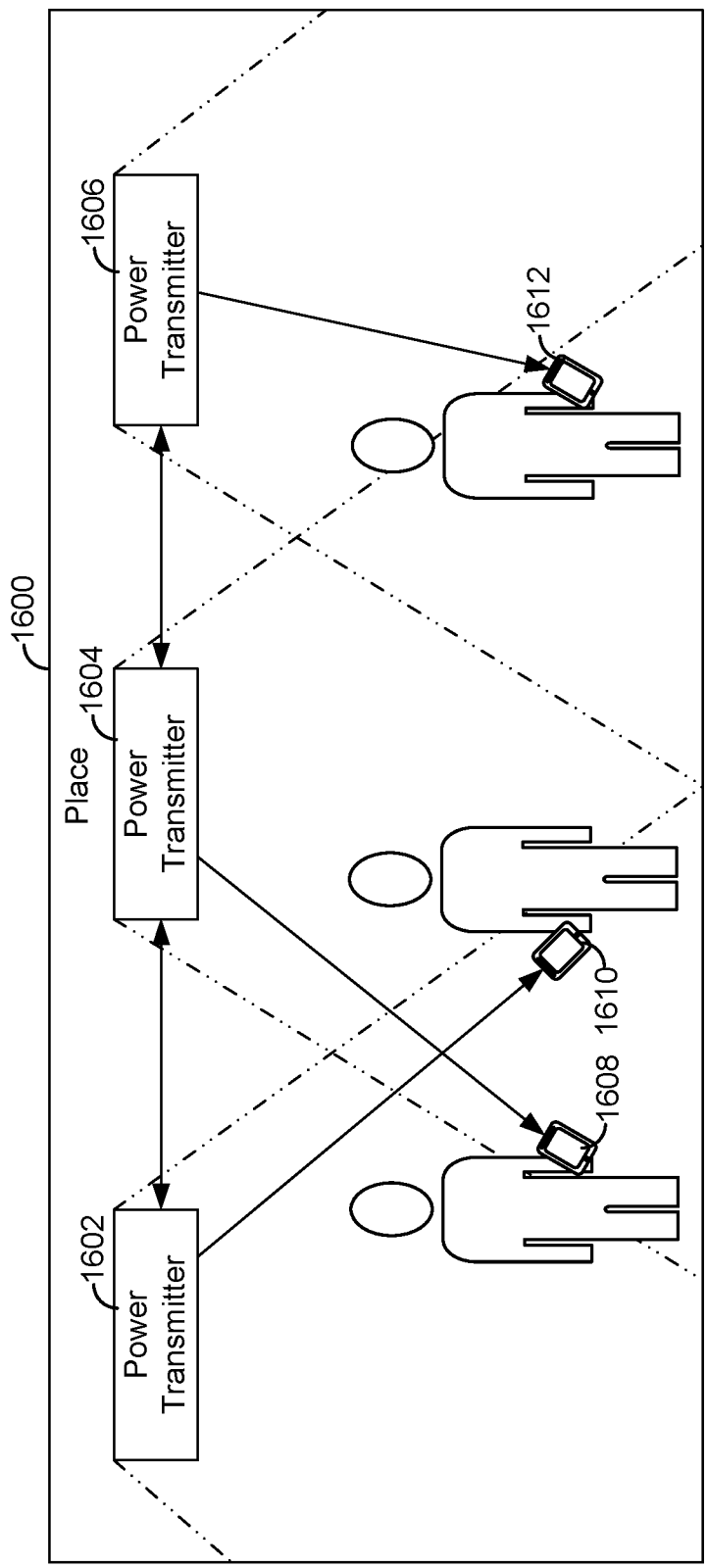
FIG. 16 is a block diagram of a place having multiple power transmitters that provide substantially continuous coverage of the place, according to an exemplary embodiment.

Referring now to FIG. 16, an illustration of a place 1600 having multiple power transmitters 1602, 1604, and 1606 that provide substantially continuous coverage of the place 1600 is shown, according to an exemplary embodiment. The power transmitters 1602, 1604, and 1606 may be arranged in a place to maximize the chance that an unobstructed transmission path exists between one of the power transmitters 1602, 1604, and 1606 and any of the devices 1608, 1610, and 1612 in the place. For example, as illustrated in FIG. 16, the charging zones (i.e., the areas within which power may be provide) of power transmitters may be positioned to overlap. A device may thereby receive power from a power transmitter even though a person is positioned between the device and a closer power transmitter.

FIG. 16 also illustrates that multiple power transmitters 1602-1606 may transmit power between each other. That is, each of the power transmitters 1602-1606 may receive power from nearby power transmitters, as well as send power to nearby power transmitters. A mesh network of the power transmitters 1602-1606 may facilitate optimal allocation of power across the multiple power transmitters 1602-1606 to best serve various devices which may receive power from dynamically switching power transmitters as devices move within a place.

Figure 17:
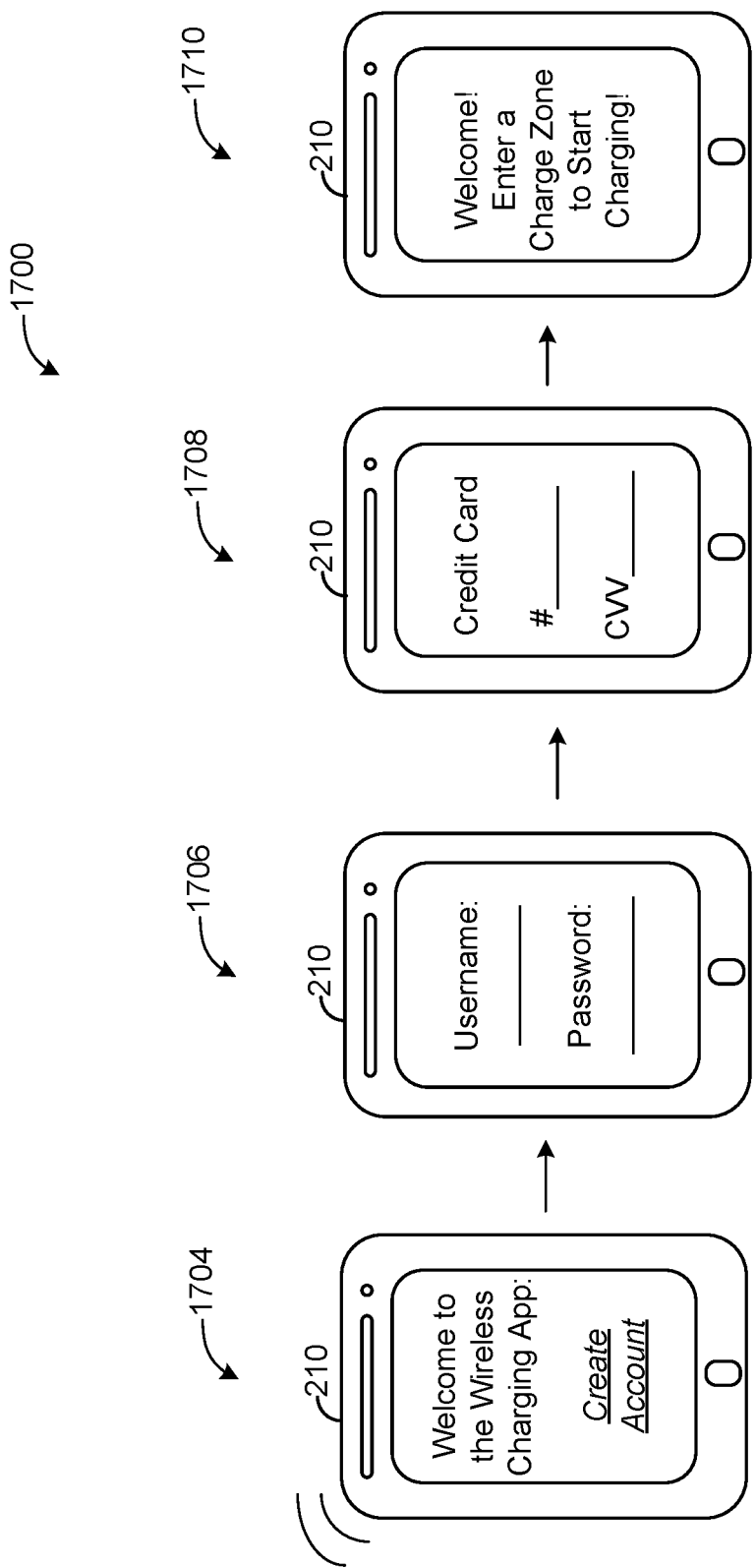
FIG. 17 is a diagram of an account creation graphical user interface in a wireless charging application for a mobile device, according to an exemplary embodiment.

Referring now to FIG. 17, a set of account creation graphical user interfaces 1700 of a wireless charging application for user device 210 are shown, according to an exemplary embodiment. As illustrated in FIG. 17, a wireless charging application may provide a graphical user interface that allows a user to create a username and password (or other verification method) (shown in interfaces 1704 and 1706) and enter payment information (shown in interface 1708). In various embodiments, the user may be prompted to sign up for memberships to various mobile charging services, pre-purchase units of power, and/or otherwise provide money to an entity associated with the wireless charging app. In some embodiments, the payment information is saved for future wireless-charging-related purchases. A confirmation interface is shown in interface 1710 once account creation is completed.

Figure 18:
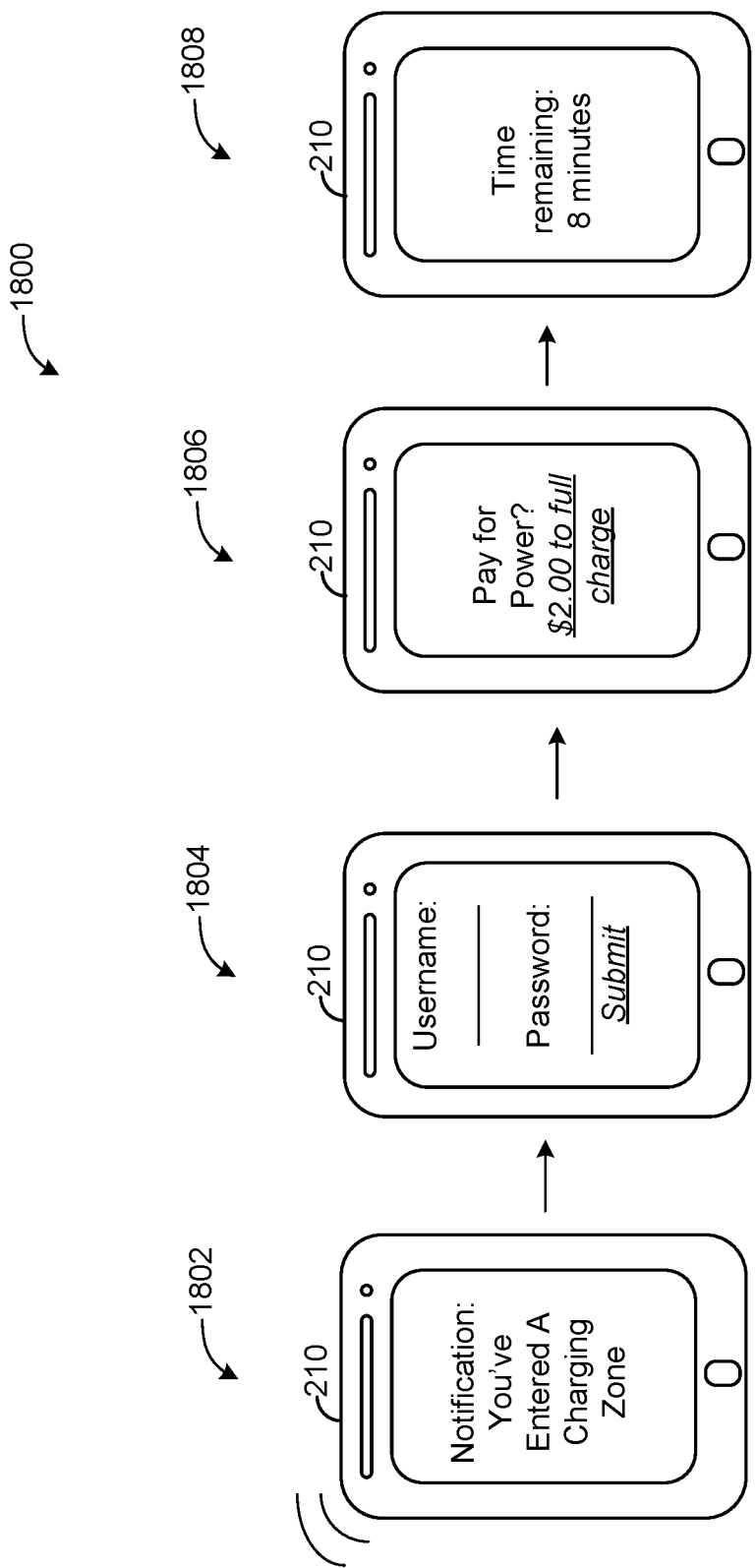
FIG. 18 is a diagram of a wireless power purchase graphical user interface in a wireless charging application for a mobile device, according to an exemplary embodiment.

Referring now to FIG. 18, a set of wireless power purchase graphical user interfaces 1800 are shown, according to an exemplary embodiment. The graphical user interfaces 1800 in FIG. 18 may be initiated when the user device 210 enters a charging zone (e.g., as shown in FIGS. 15-16). For example, the user device 210 may detect the presence of the power transmitter 102 and cause a notification (interface 1802) to be displayed on the device 210, in some cases accompanied by a sound from the device or a vibration of the device. The graphical user interface 1804 may then show a screen that allows a user to login to their account with a username and password or other verification method. Once the user has logged in, a graphical user interface 1806 prompts the user if they want to pay for charging, and may indicate a price to fully charge a device or some other unit of charge (e.g., hours of use, portion of full charge, Watts).

If the user selects to pay for the charging, the device 210 may send a request to the power transmitter 102 requesting that a power beam be directed to the device 210. The wireless charging application may authorize payment using the payment information of the user (e.g., entered as in FIG. 17) and provide a communication to the power transmitter 102 confirming authorization of the user to receive power from the power transmitter 102. The device 210 may determine a remaining time to receive the requested power and display the time remaining on a graphical user interface 1808.

Figure 19:
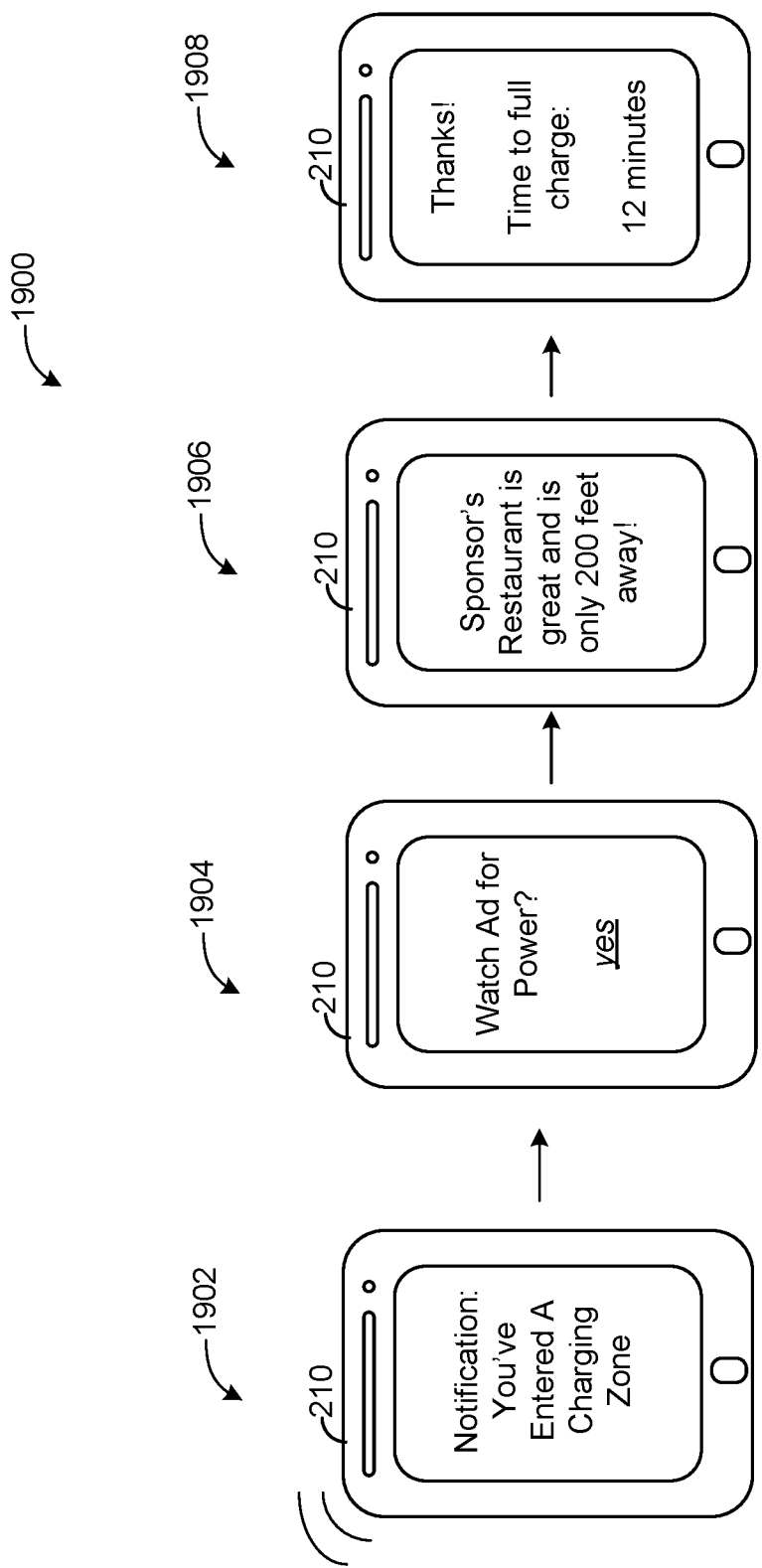
FIG. 19 is a diagram of a graphical user interface for a wireless charging system supported by advertisement revenue, according to an exemplary embodiment.

Referring now to FIG. 19, a set of graphical user interfaces 1900 for a wireless charging system supported by advertisement revenue is shown, according to an exemplary embodiment. The graphical user interfaces 1900 in FIG. 19 may be initiated when the device 210 enters a charging zone (e.g., as shown in FIGS. 15-16). For example, the user device 210 may detect the presence of the power transmitter 102 and cause a notification 1902 to be displayed on the device 210, in some cases accompanied by a sound from the device 210 or a vibration of the device 210. The graphical user interface 1904 may then show a screen that asks the user if the user wants to view and advertisement in order to access wireless power. If the user accepts, the graphical user interface 1900 may present an advertisement to the user 1906. In the example shown, the advertisement may be selected based on a location of the charging zone. For example, if the user devices is at a charging zone in an airport, the graphical user interface 1900 may display an advertisement for a restaurant located nearby in the terminal. After and/or while the advertisement is viewed, the device 210 may send an authorized/verified request for power to the power transmitter 102, which may direct a power beam to the device 210. Graphical user interface 1908 may display a time to full charge.

Figure 20:
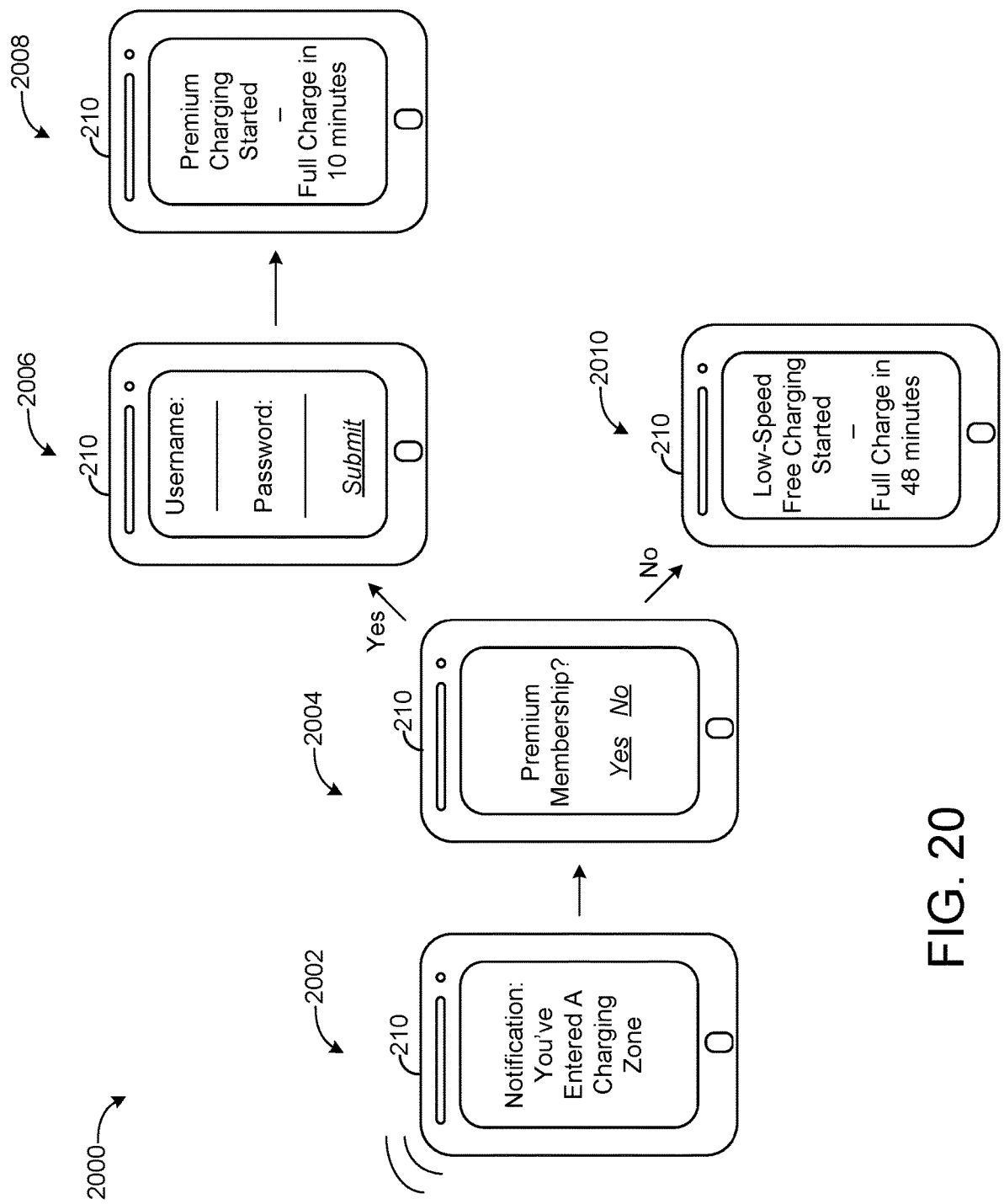
FIG. 20 is a diagram of a graphical user interface for a membership-based wireless charging system, according to an exemplary embodiment.

Referring now to FIG. 20, a set of graphical user interfaces 2000 for a membership-based wireless charging system are shown, according to an exemplary embodiment. As in FIGS. 18-19, a notification 2002 may be provided on the device when the device 210 enters a wireless charging zone. In FIG. 20, graphical user interface 2004 prompts the user to indicate whether the user has a premium membership. If the user indicates that the user has a premium membership, the user may be prompted to sign in to a premium charging account in interface 2006. After a successful sign-in attempt, the device 210 is authorized for premium charging, and the device may request and receive a high amount of power from the power transmitter. A confirmation interface 2008 can be displayed on the device 210.

If the user does not have a premium membership, the device 210 may only be authorized for low-speed charging and may request and receive a low level of power from the power transmitter 102. An indication of the low-speed charging can be provided in the interface 2010. In some cases, a bidding system may be supplied that allows users to bid against each other for priority charging. In some embodiments, an application on a user device automatically detects that the user has a premium membership, and automatically causes the user device 210 to request and receive power when in range of a power transmitter without intervention from the user. A user device 210 carried by a user may thereby receive power as the user carries the device past many power transmitters without requiring the user to provide an input to the user device 210.

Referring now to FIG. 21, an illustration of voice-activated wireless charging is shown, according to an exemplary embodiment. As shown in FIG. 21, when a user 2102 is in a charging zone with a device 2104, the user may speak to state a command to charge the device 2104 (e.g., "Charge my phone," "Charge my laptop," "Charge my watch," etc.). In some embodiments, the power transmitter 102 includes a microphone and a natural language processing circuit configured to determine the content of the speech of the user 2102 and cause the power transmitter 102 to provide power accordingly. In other embodiments, the user device 2104 is configured to process the voice command and generate a request for power in accordance with the command.

Figure 22:
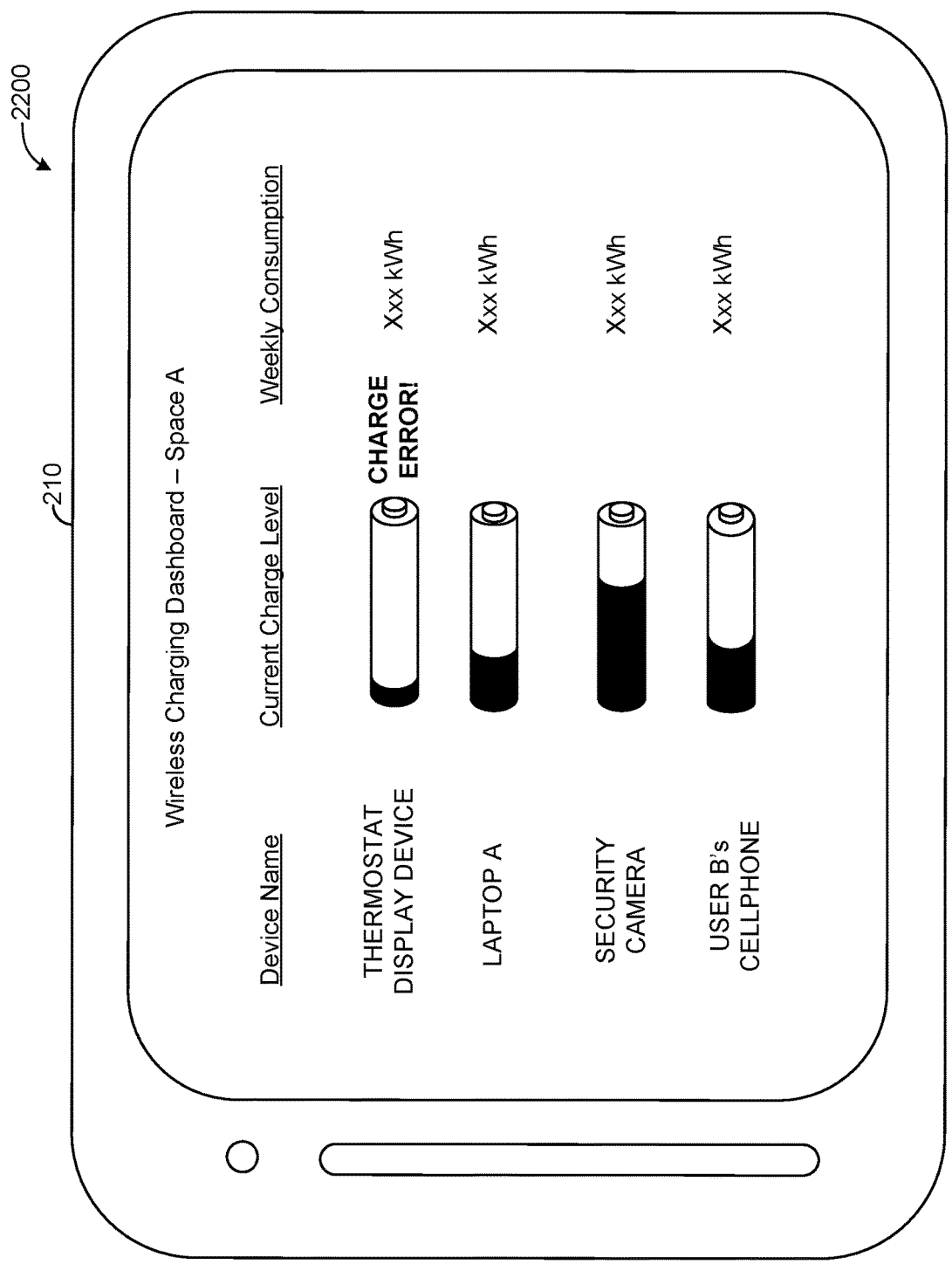
FIG. 22 is a diagram of a wireless charging dashboard, according to an exemplary embodiment.

Referring now to FIG. 22, a wireless charging dashboard 2200 is shown, according to an exemplary embodiment. The wireless charging dashboard 2200 is displayed on the user device 210, the user device 210 may be associated with a building administrator or maintenance staff member. As shown in FIG. 22, the wireless charging dashboard 2200 lists devices that receive power from a wireless power transmitter for a space, an indication of a current charge level for each device, and a weekly power consumption of each device. Data related to the devices may be sent from each device to the power transmitter 102 (e.g., current charge level) or generated based on behavior of the power transmitter 102 (e.g., data indicative of weekly power consumption of a powered device). The wireless charging dashboard 2200 may also present an indication of a charging error or other device fault. For example, a charging error may be detected when power is being provided to a device but the current charge level of that device is not increasing. In various embodiments, various metrics and other information may be included. Metrics or error messages may be generated by the power transmitter 102, by the user device 210 viewing the wireless charging dashboard 2200, or by a cloud computing service that receives data relating to the wireless charging system.

Figure 23:
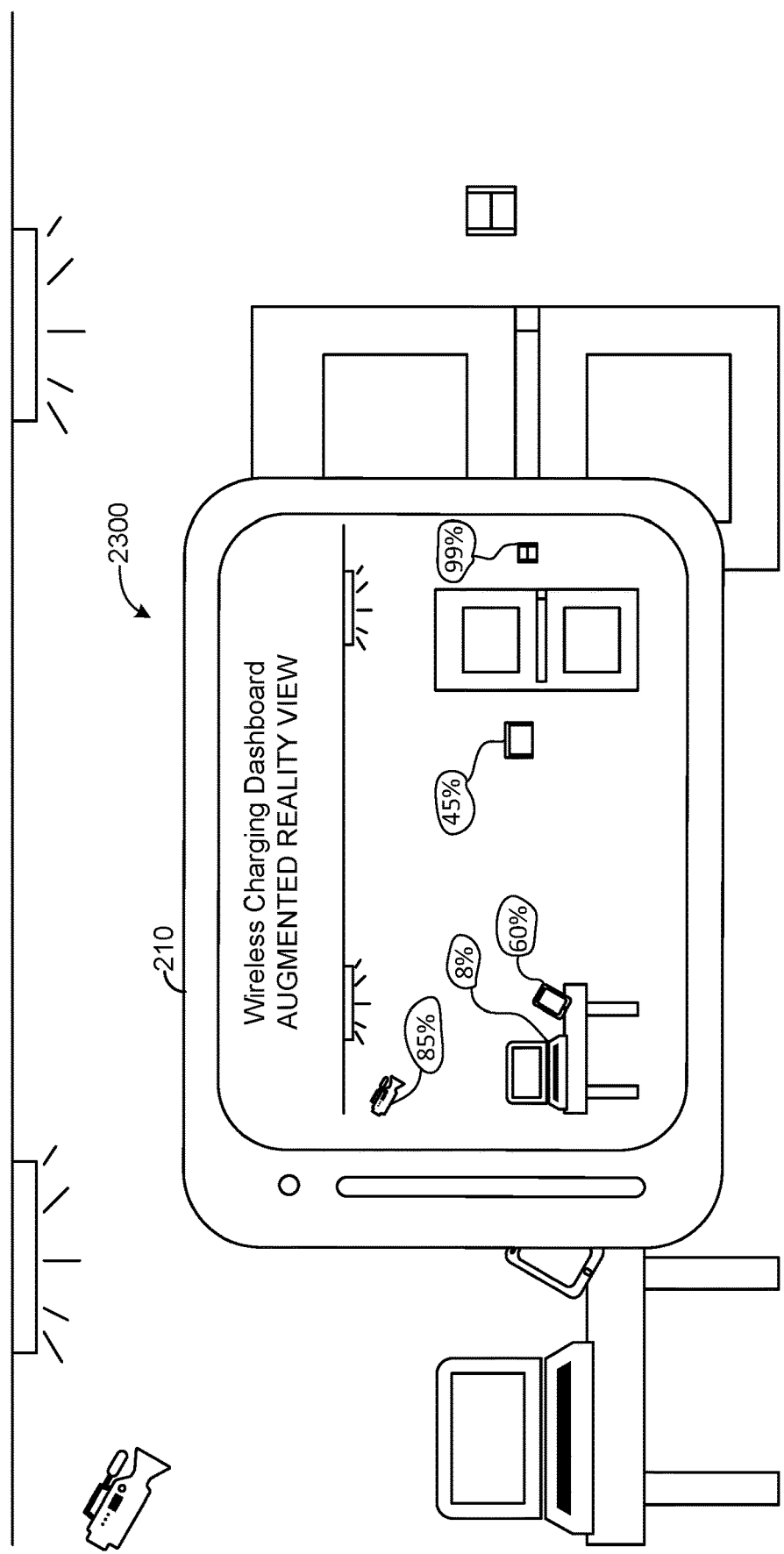
FIG. 23 is a diagram of an augmented reality view in the wireless charging dashboard of FIG. 22, according to an exemplary embodiment.

Referring to FIG. 23, an augmented reality interface 2300 in the wireless charging dashboard is shown, according to an exemplary embodiment. The augmented reality interface 2300 allows a user to direct a camera of the user device 210 towards various devices in the space. The augmented reality interface 2300 shows a real time camera feed of the space augmented by indications of which objects in the camera feed receive power from the power transmitter for the space. This allows a user to locate the various devices, which may be particularly useful for small sensors or other devices which may be difficult to locate. The augmented reality view also shows the charge level of each identified device. In various embodiments, various other metrics may be included in the augmented reality interface 2300. A user may thus scan around the room to view the charge level and/or other status of the various devices in a wireless charging system.

Figure 24:
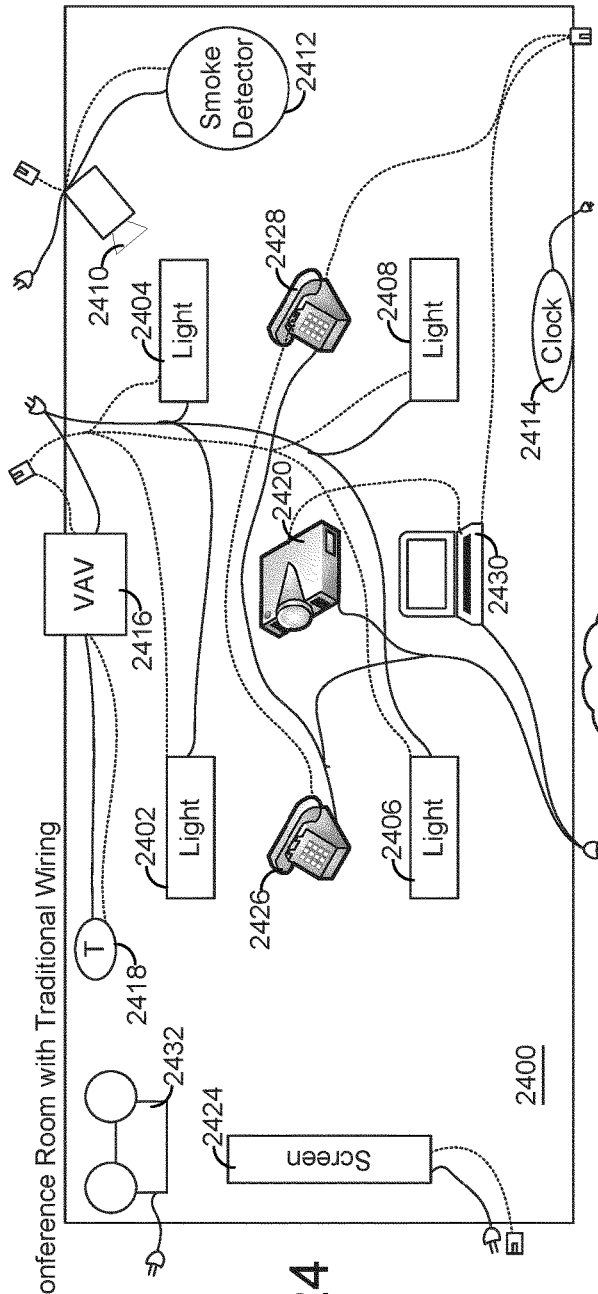
FIG. 24 is a diagram of a wired conference room, according to an exemplary embodiment.
Figure 25:
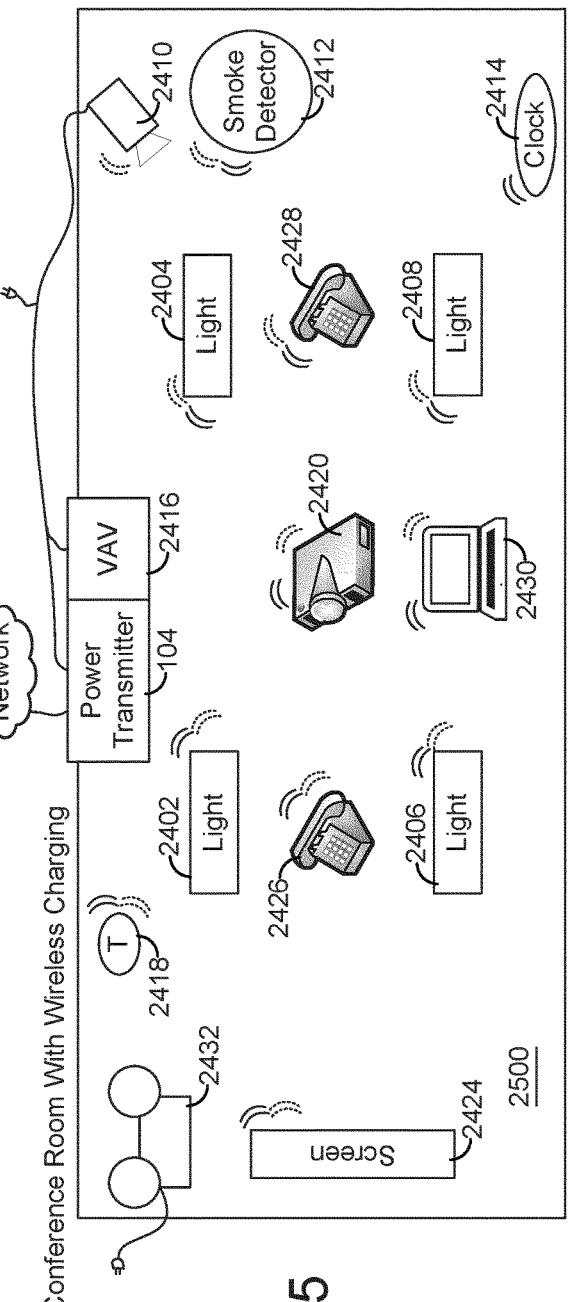
FIG. 25 is a diagram of a conference room with the wireless charging system of FIG. 1A, according to an exemplary embodiment.

Referring now to FIGS. 24-25, a pair of wiring diagrams for a conference room are shown to illustrate some advantages of wireless charging, according to an exemplary embodiment. FIG. 25 shows a conference room 2400 with traditional wiring, while FIG. 25 shows a conference room 2500 with wireless charging. Both FIGS. 24 and 25 include various equipment often found in conference rooms, including lights 2402, 2404, 2406, and 2408, a security camera 2410, a smoke detector 2412, a clock 2414, a VAV box 2416, a thermostat 2418, a projector 2420, a powered/retractable screen 2424, phones 2426 and 2428, a laptop 2430, and an emergency alarm 2432. With the traditional wiring of FIG. 24, some or all of these devices required both a wire for power and a cable for data to be physically run to the device. Installing these wires requires substantial labor, physical alterations to rooms (e.g., holes in walls, holes through tables, cable guides along floors), and potential danger (e.g., electrocution risk while completing wiring tasks), and making any changes may be even more challenging. With the wireless charging system of FIG. 25, the power transmitter 102 can be simply integrated with the VAV box 2416 along a ceiling of the space, where open manifold space for wiring and other building systems is easily accessible. No wiring is required through the interior of the space, as everything can receive power and communicate data (e.g., controls signals, data, communications) wirelessly via the power transmitter 102.

It should be understood that wireless charging systems as described herein make installation, configuration, and alteration of a space easy and efficient, and may remove or minimize the need for expert electricians in constructing or redesigning a space. Furthermore, new devices may be added to the space without the need for new, additional wiring. Design constraints linked to locations of power outlets may be removed. Accordingly, in order to switch the conference room of FIG. 25 to an office, for example, one need only to replace the conference room devices and furniture with devices and furniture need for an office and change the space profile for the space from a conference room space profile to an office space profile. No electrician expertise is required.

Figure 26:
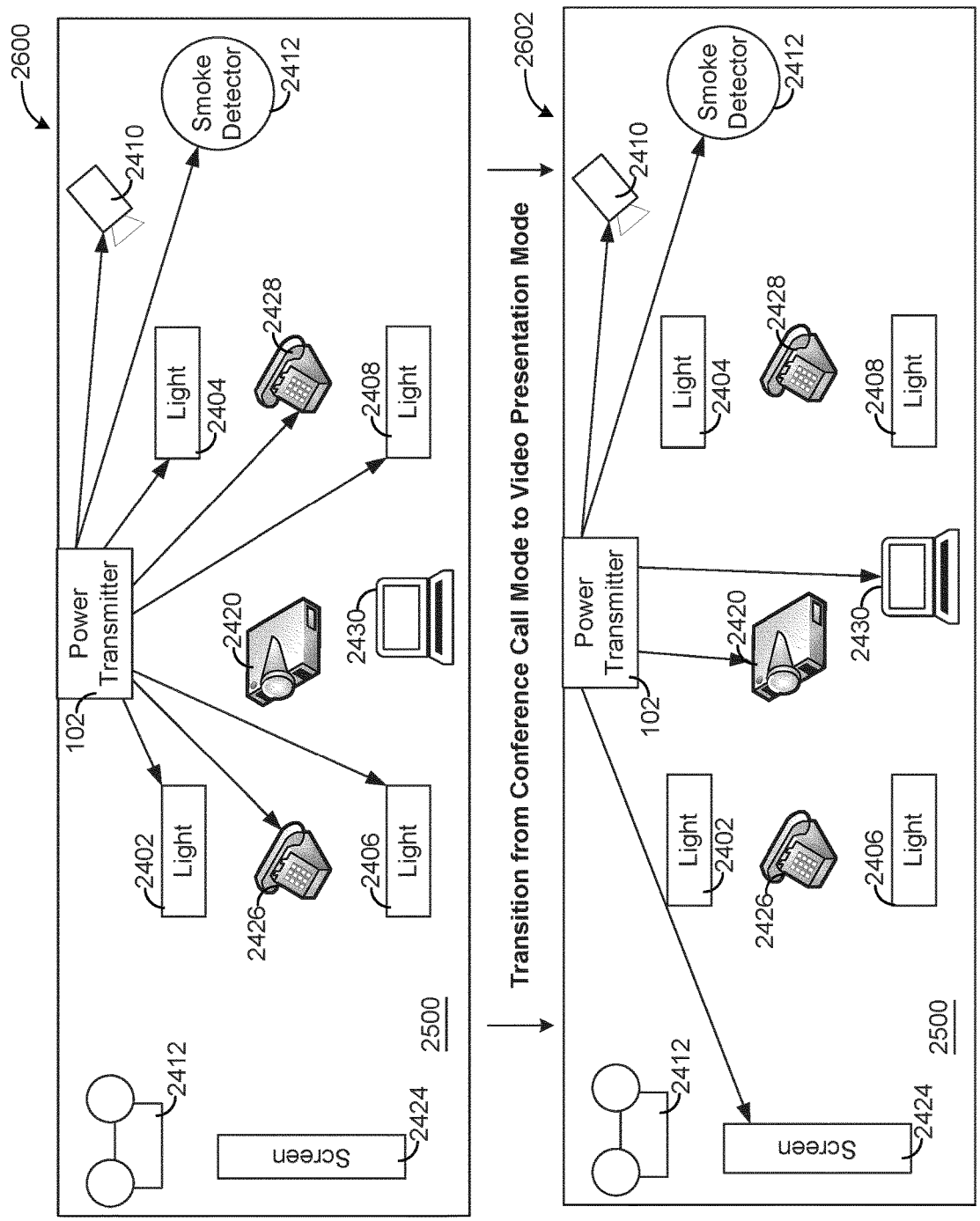
FIG. 26 is an illustration of mode-based control of the power transmitter of FIG. 1A, according to an exemplary embodiment.

Referring now to FIG. 26, an illustration of mode-based (zone mode based) control of the power transmitter 102 is shown, according to an exemplary embodiment. More particularly, FIG. 26 illustrates a transition from a conference call mode (shown in the top pane 2600) to a video presentation mode (shown in the bottom pane 2602). In the conference call mode, the power transmitter 102 is controlled to provide power to the lights 2402, 2404, 2406, and 2408 and the phones 2426 and 2428 in the conference room to allow the occupants to see clearly (e.g., the conference room 2500 to be well lit) and to operate the phones 2426 and 2428. The power transmitter may also provide power to a security camera 2410 and a smoke detector 2412. At some point, a transition to a video presentation mode may be triggered (e.g., by a user selection of a button in the space, by a user spoken statement relating to presenting a video, by a schedule video presentation in a calendaring system, etc.).

When the video presentation mode is triggered, the power transmitter 102 may provide power to the projector 2420, to the motorized screen 2424 to allow the screen 2424 to move into position to receive images from the projector 2420, and to the laptop 2430 or other video player device used to provide the images emitted by the projector 2420. In some cases, the power transmitter 104 may send a wake up signal to these devices to cause them to turn on when the video presentation mode is triggered. In some cases, the power transmitter 102 may cause a power-saver mode of a device to be disengaged when the device is needed for use in a current mode.

The power transmitter 102 may also cease providing power to the lights 2402, 2404, 2406, and 2408 and the phones 2426 and 2428, in order to assure that the room 2500 is darkened for the video of the projector 2420 and to prevent the phones 2426 and 2428 from ringing during the video presentation. Accordingly, FIG. 26 illustrates that the power transmitter 102 may be controlled under mode-based control to provide power to the devices that require power under a current mode. Furthermore, FIG. 26 illustrates that the power transmitter 102 may facilitate variable power levels used by various devices depending on the needs for those devices in various modes. For example, a sensor may be operated at a higher power to provide more data at a higher granularity when needed for a mode, and operated at a lower power to provide less data when a lower amount of data is need for the current mode.

Figure 27:
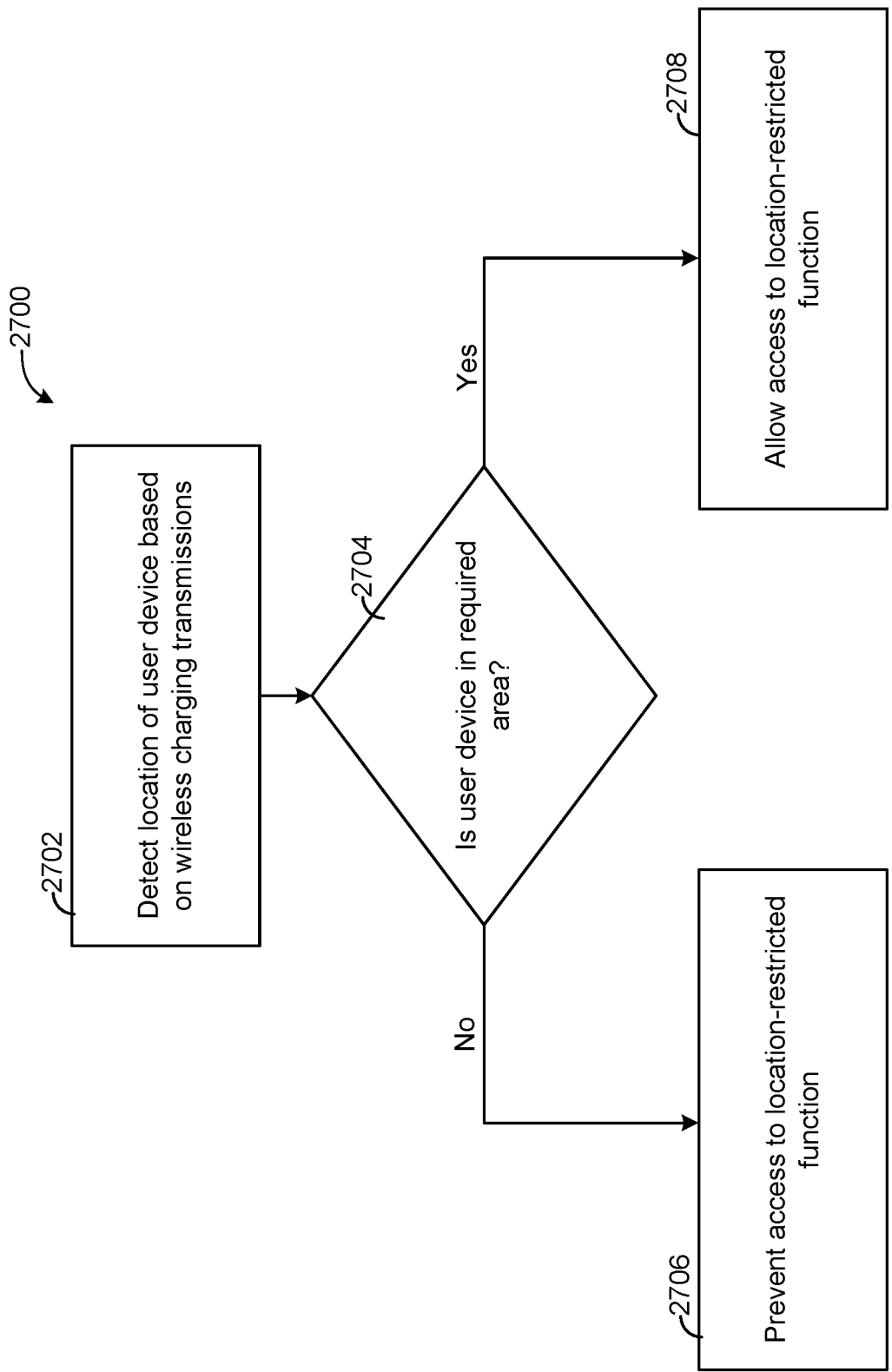
FIG. 27 is a flowchart of a process for authorizing restricted functions based a location of a user device, according to an exemplary embodiment.

Referring now to FIG. 27, a flowchart of a process 2700 for authorizing restricted functions based a location of the user device 210 is shown, according to an exemplary embodiment. In the process 2700 of FIG. 27, a location the user device 210 is detected based on wireless charging transmissions of the power transmitter 102 (e.g., based on a trajectory of a power beam directed to the user device) (step 2702). Because the power beam trajectories are aimed by the power transmitter 102 with a high degree of accuracy to avoid loss of power and unnecessary radiation, the location of the device 210 may be determined by the power transmitter 102 with a much higher accuracy than with traditional real time location services methods. The process 2700 then asks whether the determined location of the user device 210 is within a required location (step 2704). If the device 210 is within the required location, the user may be allowed to access a location-restricted function, either on the user device 210 or on another device or system (step 2708). If the device 210 is not within the required location, the user may be prevented from accessing the location-restricted function (step 2706). As one example, a door may unlock only when a user holds the user device 210 at a precise point in space proximate the door.

Figure 28:
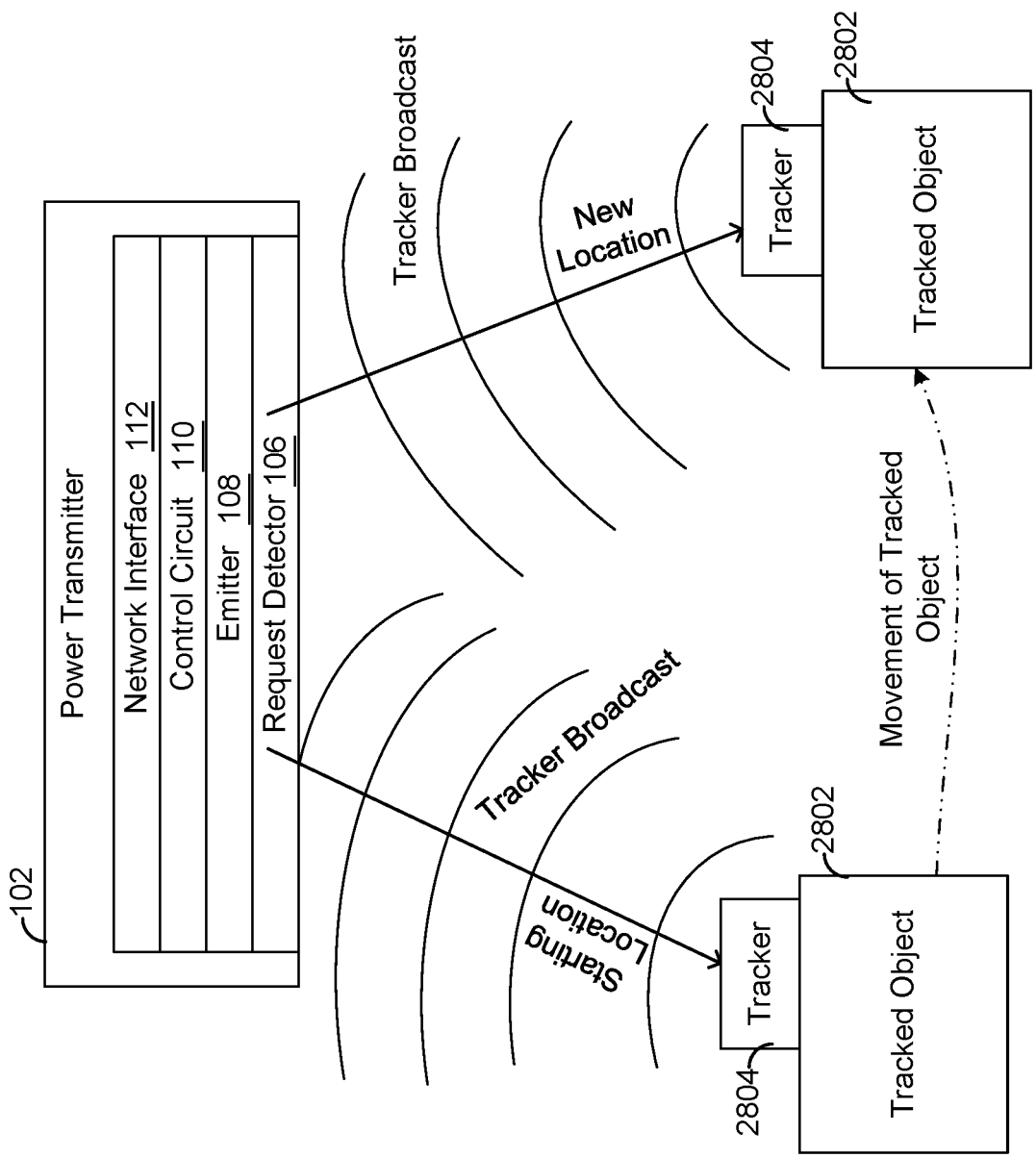
FIG. 28 is an illustration of the power transmitter of FIG. 1A being used to track a tracked object, according to an exemplary embodiment.

Referring now to FIG. 28, an illustration of the power transmitter 102 tracking a tracked object 2802 is shown, according to an exemplary embodiment. As shown in FIG. 28, a tracker 2804 may be attached to the tracked object 2802 to facilitate tracking of the tracked object 2802 by the power transmitter 102. The tracked object 2802 may be an inanimate object such as a piece of furniture, a box, a door, a window, a shipping container, etc. The tracker 2804 is configured to broadcast a track request, which may be similar to the request for power requested by the device 104 of FIG. 1A. However, while the tracker 2804 may receive a limited amount of power from the power transmitter 102 to facilitate its tracking functions, the primary purpose of the track request broadcast is to indicate a location of the tracker 2804 to the power transmitter 102. The request detector 106 may detect the location of the tracker based on the trajectory of incidence of the track request on the power transmitter. Over time, the tracked object 2802 may move, and the power transmitter 102 may track this movement. Accordingly, the tracker 2804 of FIG. 28 allows the power transmitter 102 to track the location of objects that do not consume electrical power from the power transmitter 102.

Figure 29:
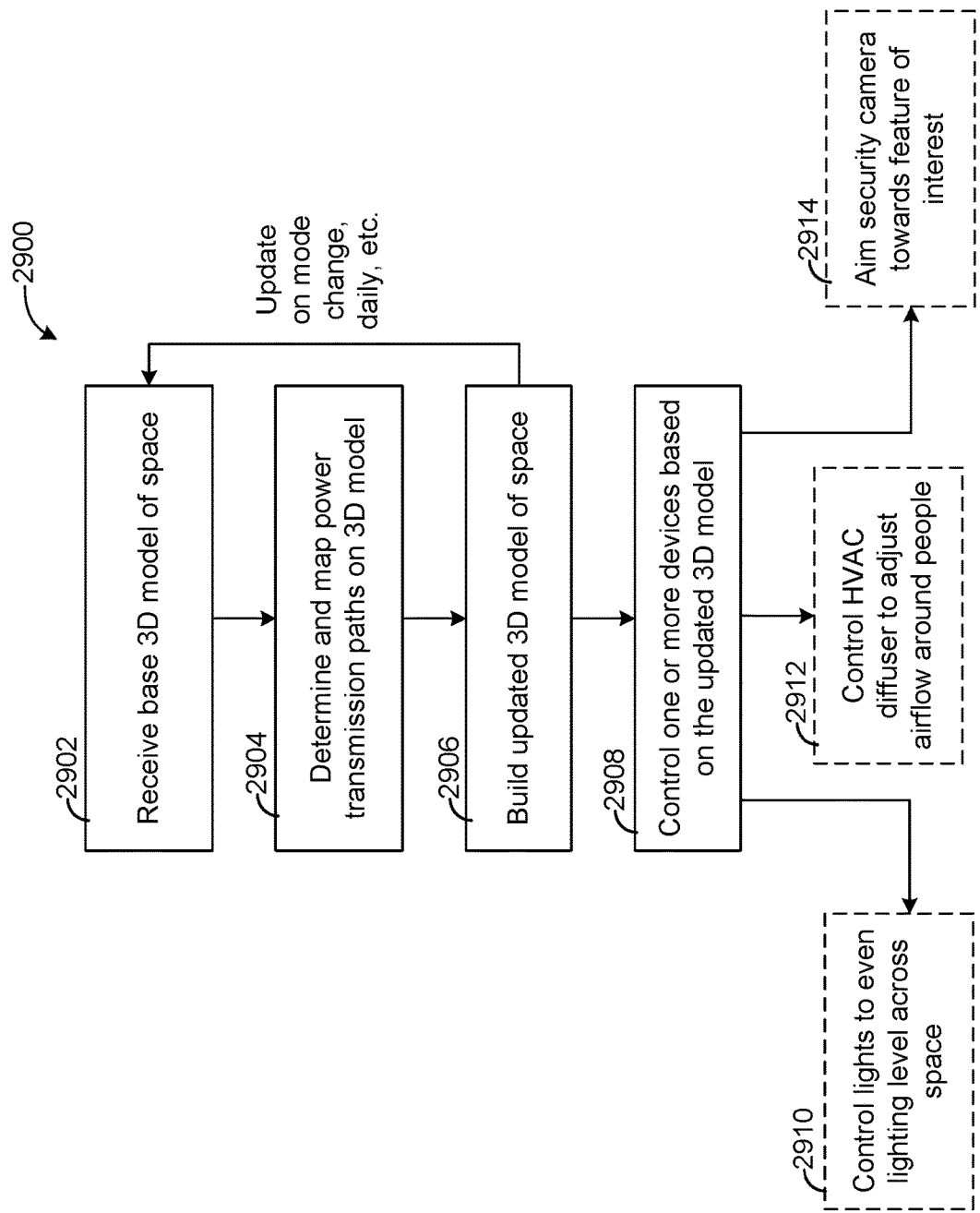
FIG. 29 is a flowchart of a process for generating and utilizing a three-dimensional (3D) model of a space using a wireless charging system, according to an exemplary embodiment.

Referring now to FIG. 29, a flowchart of a process 2900 for generating and utilizing a three-dimensional (3D) model of a space using a wireless charging system is shown, according to an exemplary embodiment. The process 2900 of FIG. 29 begins by receiving a base 3D model of the space (step 2902), for example that includes the floor, walls, doorways, windows, large furniture, etc. of the space. The 3D model may be a building information model (BIM), a BRICK model, a graphical model, and/or any other model. In some embodiments, the base model also includes data collected from devices, which identify themselves and their location within a space. The power transmitter 102 collects data relating to the transmission paths of power beams sent out to various devices in the space, and the transmission paths are mapped onto the 3D model (step 2904). In some cases, it may be determined that a power beam undergoes one or more reflections before reaching a device, which may indicate a presence of a person or other unknown object in the space. The change in transmission paths over time may also be used in determining the location of various people and things in a space. The transmission path data and information that may be derived therefrom is used to build an updated 3D model of the space (step 2906), e.g., a 3D model of the space that includes the locations of the various devices. One or more devices in the space may then be controlled based on the 3D model (step 2908).

In some embodiments, charging information, e.g., device charge levels, device charging errors, etc. are received and/or determined by the power transmitter 102. The power transmitter can cause 3D model to include both indications of the locations of the devices and the charging information. Charging information and various exemplary charging information indications are described in greater detail with reference to FIG. 22. In this regard, the 3D model can be rendered on a user interface, e.g., on the device 210. In some embodiments, a charging information overlay can be generated for real images, e.g., a virtual reality display. Virtual reality displays are described in greater detail with reference to FIG. 23.

For example, as indicated in FIG. 29, lights may be controlled to even lighting across a space, for example to decrease power to a light near a window and increase power to a light located far from the window (step 2910). As another example indicated on FIG. 29, the 3D model may be used to control an HVAC diffuser to direct airflow around people in the space (step 2912). As another example indicated on FIG. 29, the 3D model may be used to aim a security camera towards a feature of interest, for example an exterior door, a person in the space, a moving tracked object, etc. (step 2914). As indicated in FIG. 29, the 3D model of the space may be updated when a mode changes (e.g., to build a different model for an occupied mode, an unoccupied mode, etc.) and/or at preset time intervals.

Figure 30:
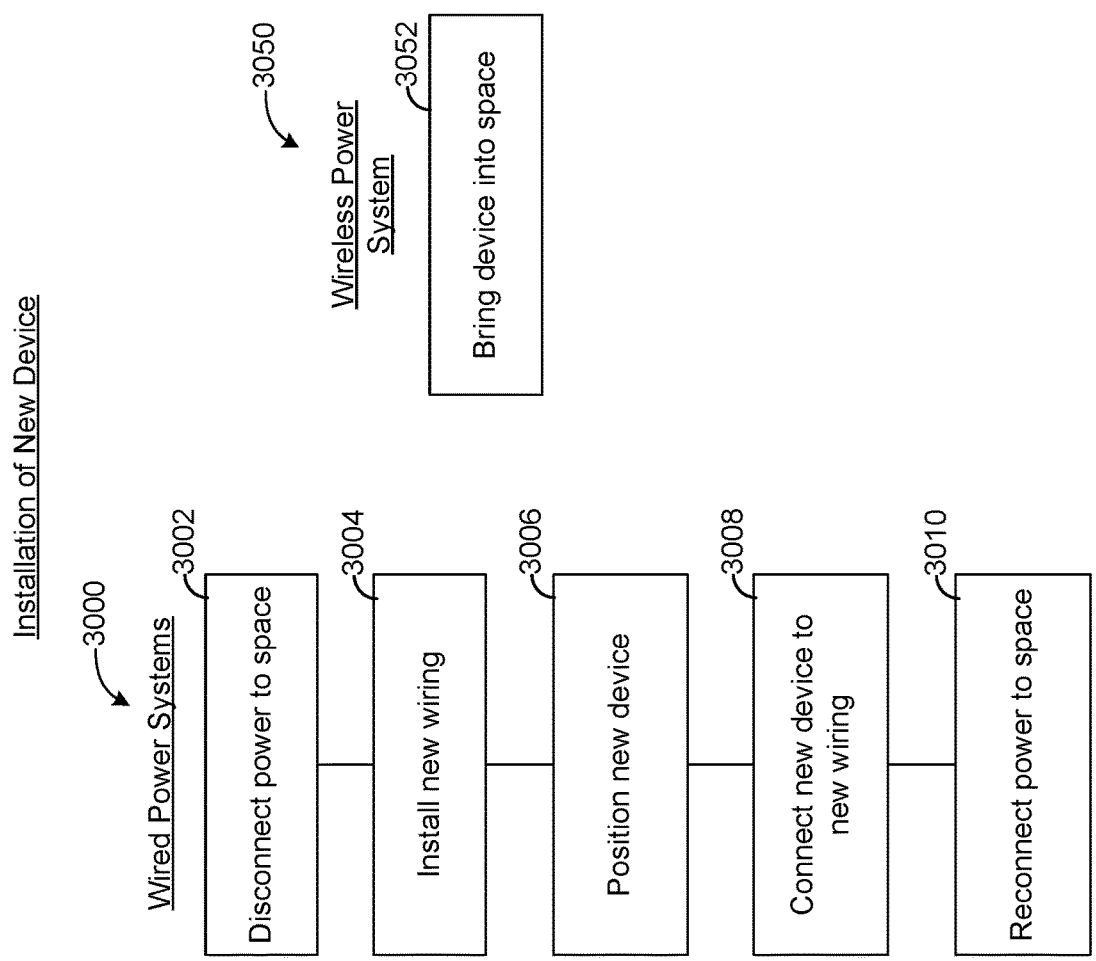
FIG. 30 is a pair of flowcharts comparing the steps of powering a new device in a space in a wired power system and the wireless power system of FIG. 1A, according to an exemplary embodiment.

Referring now to FIG. 30 a pair of flowcharts of a process 3000 and a process 3050 comparing the steps of powering a new device in a space in a traditional wired power system and the wireless power system described herein are shown, according to an exemplary embodiment. In a traditional wired power system, to install a new electrical device, power to a space must be disconnect to allow for safe manipulation of electrical wiring (step 3002). New wiring must then be installed to run from the existing wiring to a desired location of the new electrical device (step 3004). The new device must be positioned at that location (step 3006) and connected to the new wiring (step 3008). Power may be then be reconnected to the space to provide the new device with power (step 3010). This may require a professional electrician, may require cutting holes in drywall, flooring, etc. to install new wiring, and may carry a risk of electrocution. In contrast, all that is required to power a new device in the wireless power system is to bring the device into a space such that the device is along a direct or indirect transmission path from the power transmitter (step 3052). The device may automatically connect to the power transmitter and begin receiving power wirelessly. The wireless power system therefore presents a much easier and efficient installation process than traditional systems.

Figure 31:
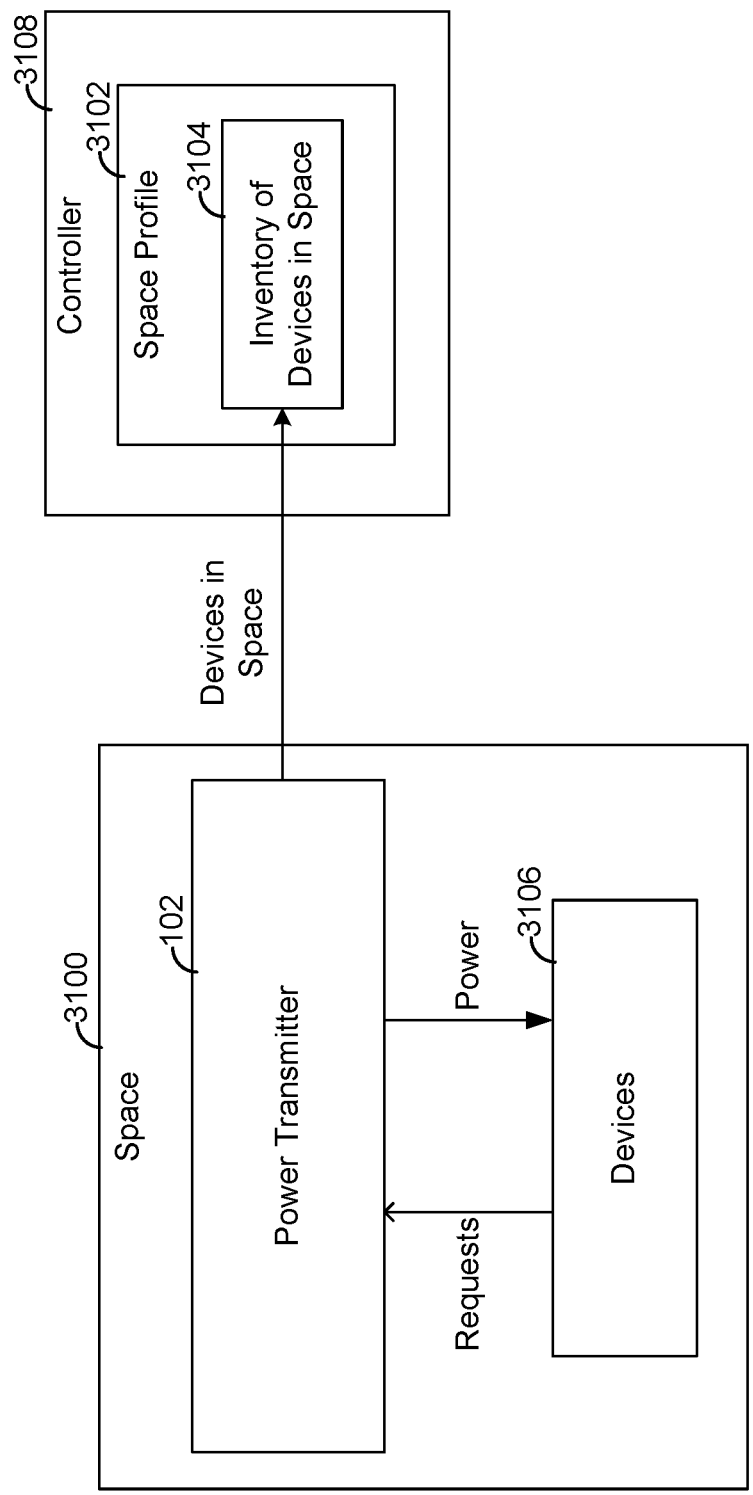
FIG. 31 is a block diagram of interactions between the wireless charging system and a space profile, according to an exemplary embodiment.

Referring now to FIG. 31, a block diagram showing an interaction between the wireless charging system and a space profile is shown, according to an exemplary embodiment. One type of information stored in a space profile 3102 for a space may be a list or inventory 3104 of the devices 3106 in the space 3100. As illustrated by FIG. 31, the power transmitter 102 serves the space 3100 and may receive requests for power from the devices 3106 in the space and provide power to the devices 3106 in the space 3100. The power transmitter 102 may also receiving and identifier (e.g., name, serial number, fully-qualified-reference) from each device in the space. The power transmitter 102 is thereby aware of what devices 3106 are in the space 3100. As shown in FIG. 31, the power transmitter 102 may provide a list of the devices 3106 in the space to a controller 3108 that stores the space profile 3102 for the space 3100. The inventory of devices 3104 in the space stored in the space profile 3102 may thereby be updated (e.g., in real time, daily, etc.) based on information collected by the power transmitter 102.

Figure 32:
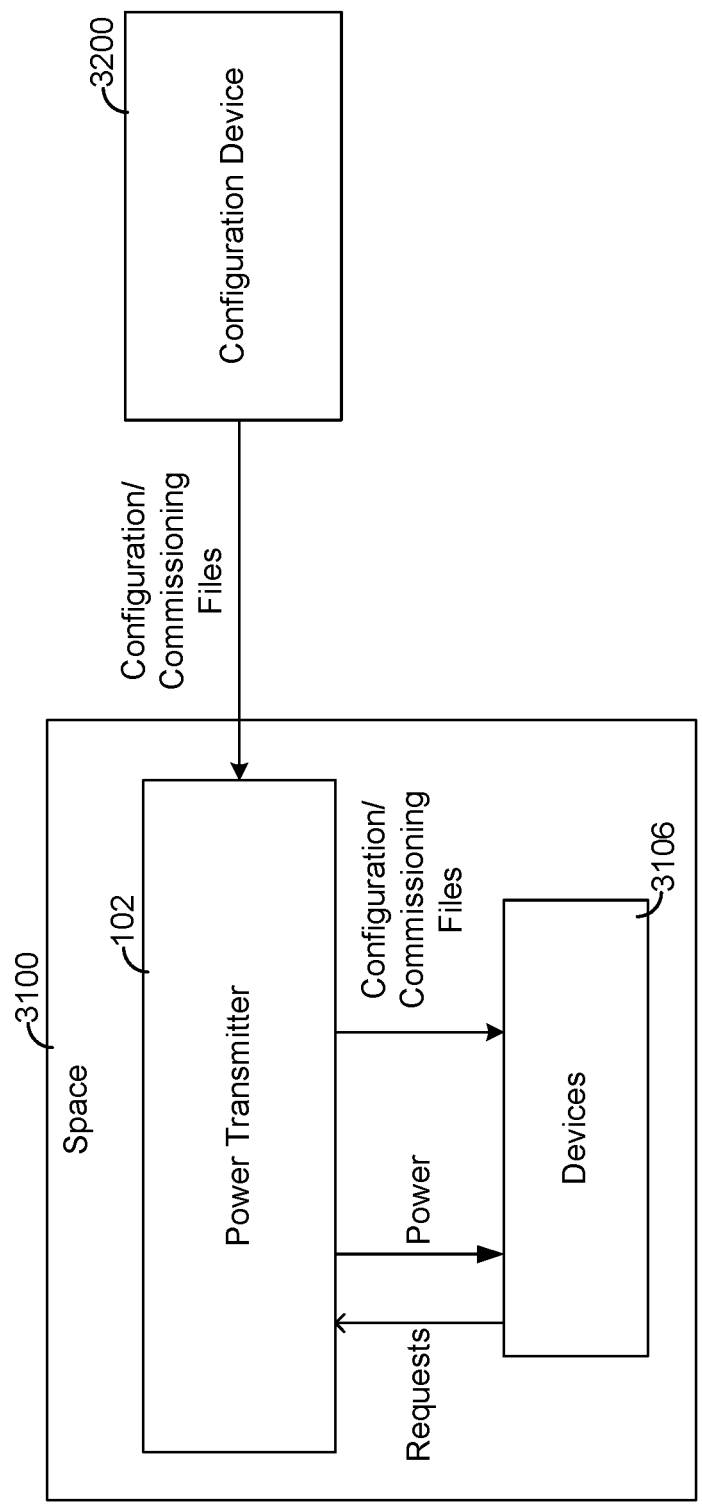
FIG. 32 is a block diagram of the power transmitter of FIG. 1A facilitating configuration and commission of various devices in a space, according to an exemplary embodiment.

Referring now to FIG. 32, a block diagram showing how the power transmitter 102 may be used to facilitate configuration and commission of various devices 3106 in the space 3100 is shown, according to an exemplary embodiment. As described with reference to FIG. 30, when new devices, the devices 3106, are brought into view of the power transmitter 102, the devices 3106 and the power transmitter 102 may automatically connect to the devices 3106 and provide power to the devices 3106. This automatic connection may be used to facilitate the provision of configuration and commissioning files to the devices 3106, for example before a building automation network or other communication channel can be established. As shown in FIG. 32, a configuration device 3200 may provide configuration/commissioning files to the power transmitter 102, which may communicate the files to one or more of the devices 3106 in the space 3100. The power transmitter 102 may thereby facilitate configuration and commissioning of the devices 3106.

Figure 33:
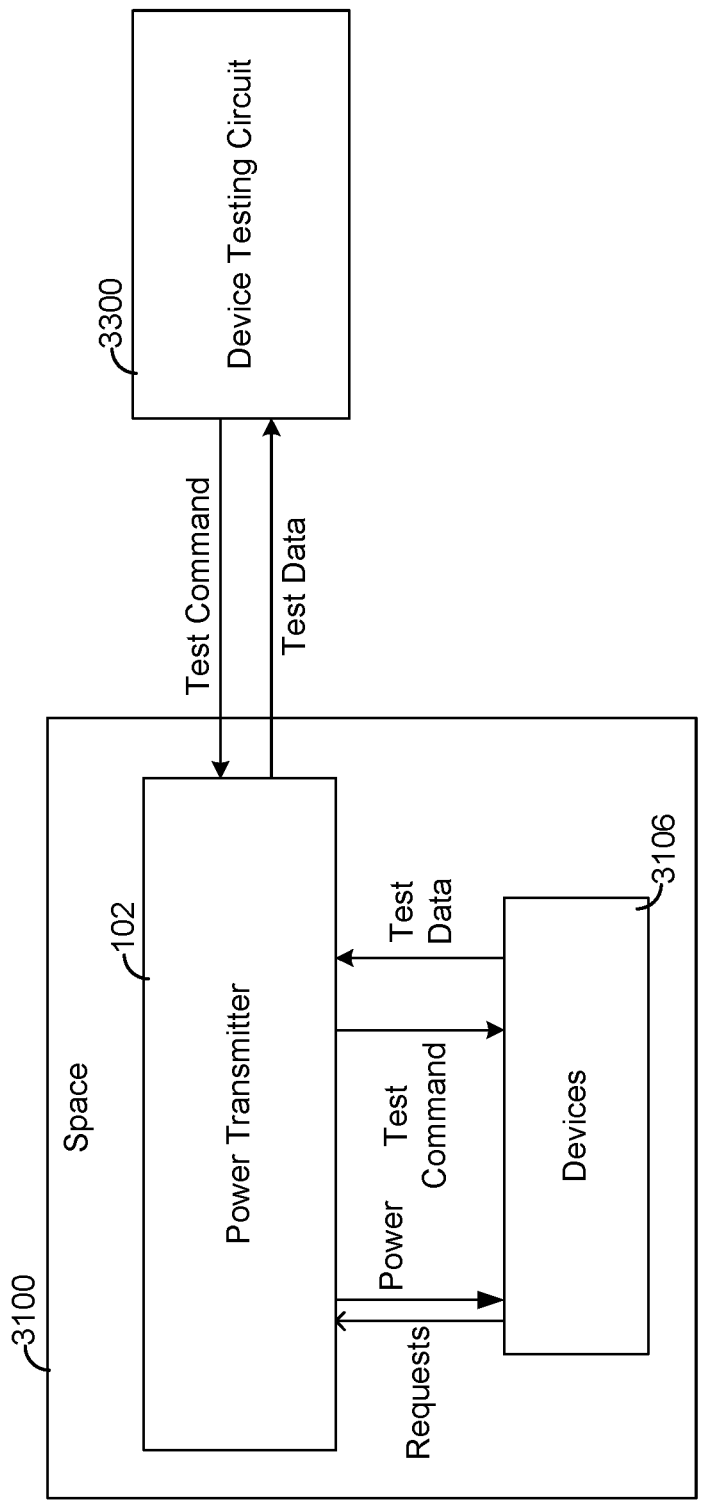
FIG. 33 is a block diagram of the power transmitter of FIG. 1A facilitating testing of various devices in a space, according to an exemplary embodiment.

Referring now to FIG. 33, a block diagram showing how the power transmitter 102 may be used to facilitate testing of the devices 3106 in the space 3100 is shown, according to an exemplary embodiment. As shown in FIG. 33, a device testing circuit 3300 may send test commands to the power transmitter 102. The power transmitter 102 may forward the test commands to the appropriate devices 3106, which receive power from the power transmitter 102. The test commands may control the devices 3106 to perform test procedures. The devices 3106 may then send test data to the power transmitter that indicates that the devices performed the tests and/or contains data relating to performance on the tests. This test data is then returned to the device testing circuit 3300. The power transmitter 102 may thereby be used to facilitate testing of various devices 3106 across domains in a unified process.

Figure 34:
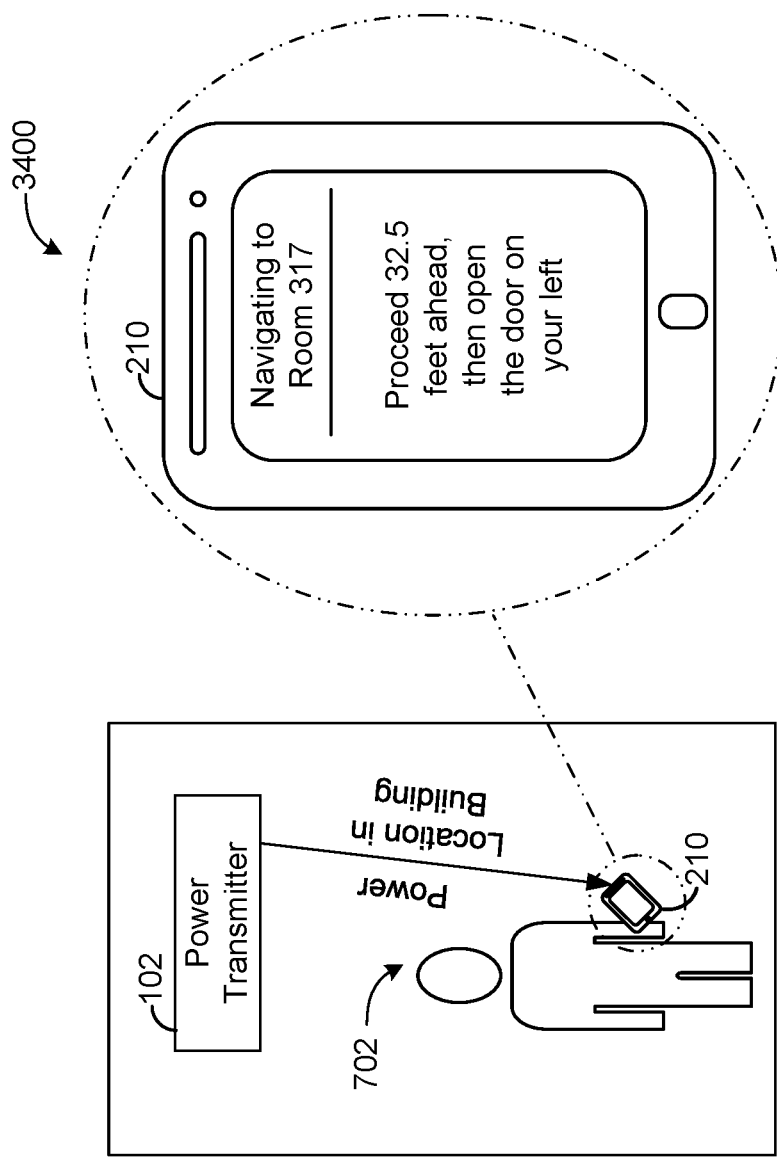
FIG. 34 is an illustration of a navigation feature performed by the power transmitter of FIG. 1A, according to an exemplary embodiment.

Referring now to FIG. 34, a navigation feature provided by a wireless charging system is shown, according to an exemplary embodiment. As shown in FIG. 34, the power transmitter 102 provides power to the user device 210 along a transmission path. Based on a known (e.g., fixed) location of the power transmitter 102 and the trajectory of the transmission path, the location of the user device 210 within a building may be determined with a high degree of accuracy. This location may be provided to the user device 210 by the power transmitter 102. The user device 210 may user the location and a stored map of the building to provide navigation directions on a graphical user interface 3400 displayed on the user device 210 to guide the user 702 through the building. In some embodiments, the power transmitter 102 uses the location of the device 210 and a stored indication of a navigation destination to generate one or more navigation directions and/or a navigation interface. The power transmitter 102 can be configured to transmit the navigation directions and/or the navigation interface to the user device 210 for review by the user 702.

Figure 35:
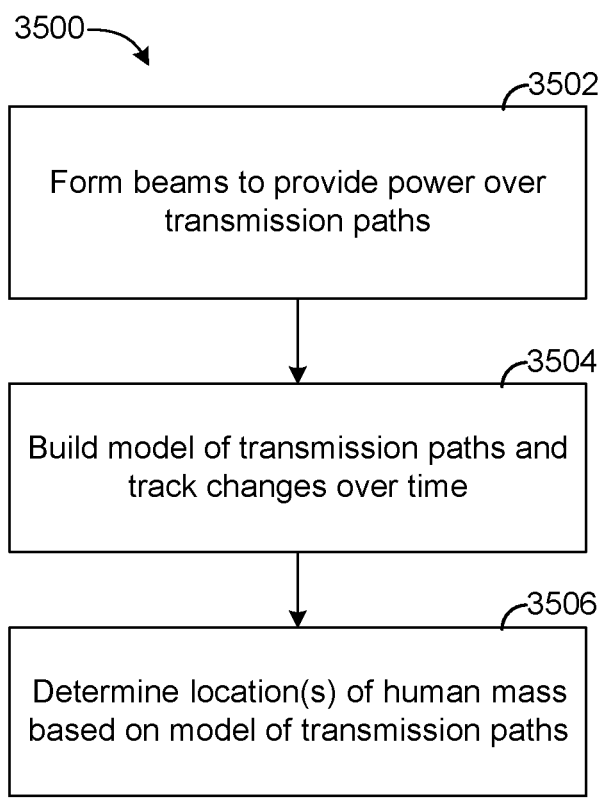
FIG. 35 is a flowchart of a process of determining the location of humans in a space or place, according to an exemplary embodiment.

Referring now to FIG. 35, a flowchart of a process 3500 for determining the location of humans in a space or place is shown, according to an exemplary embodiment. One or more power transmitters (e.g., similar to or including the power transmitter 102) receive requests for power from multiple devices and form power beams to provide power over transmission paths aimed back along the trajectories of the received requests (step 3502). A model of these transmissions paths may be formed and changes in transmission paths may be tracked over time (step 3504). The locations of human mass (e.g., high-water-content human bodies that are highly absorptive of power beams and power requests) may be estimated based on the modelled transmission paths and the changes over time (step 3506).

For example, it may be assumed that no transmission path pass through a human body. As another example, it may be assumed that a device that appears to be moving is moved under human power (i.e., by a human). Based on these and other assumptions, locations of human mass may be determined in a space or place. This data may then be used for controlling HVAC equipment based on occupancy of spaces and places, for intrusion detection, for controlling lighting based on occupancy, for traffic detection in wayfinding applications, and/or for various other purposes.

Figure 36:
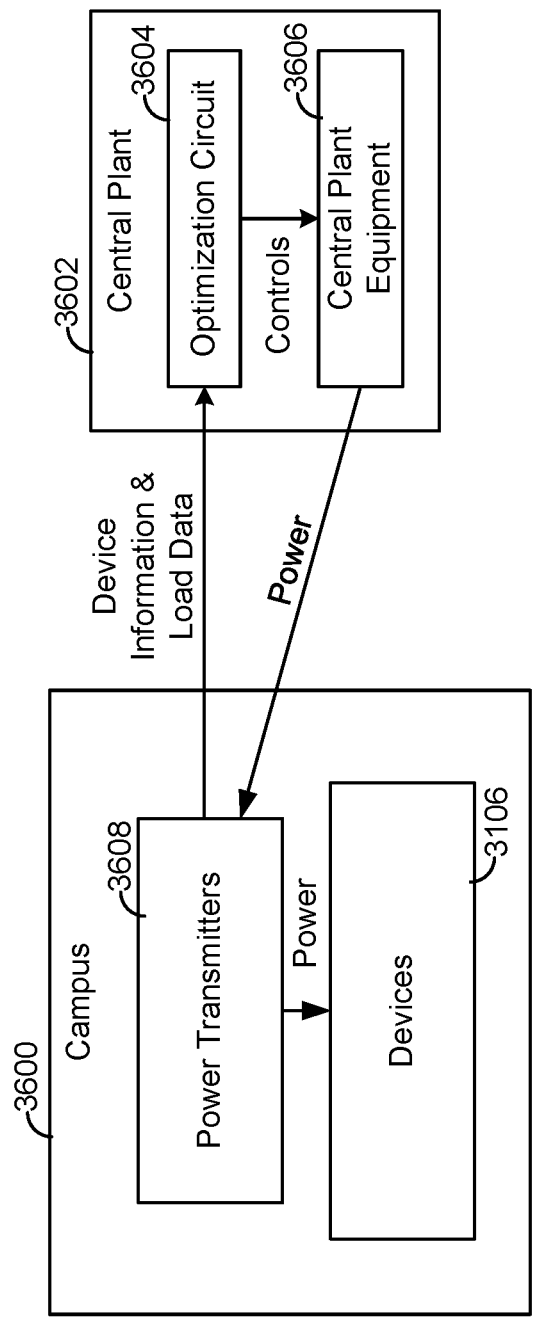
FIG. 36 is a block diagram of power transmitters facilitating cost optimization of utility costs for a campus with a central plant, according to an exemplary embodiment.

Referring now to FIG. 36, a block diagram illustrating how power transmitters 3608 (e.g., similar to or including the power transmitter 102) may facilitate cost optimization of utility costs for a campus 3600 with a central plant 3602 is shown, according to an exemplary embodiment. As shown in FIG. 36, the campus 3600 may include a large number of power transmitters 3608 that provide power to a large number of devices, e.g., the devices 3106. The power transmitters 3608 may collect and store device information and load data relating to the electricity load consumed, requested, and/or predicted to be requested by the devices 3106. The power transmitters 3608 may provide this device and load data to an optimization circuit 3604 configured to control the central plant equipment 3606 to minimize a cost of providing the power requested by the devices 3106 over time. Various strategies for central plant optimization may be adapted for use with power transmitters 3608. The central plant equipment 3606 provides the power to the power transmitters 3608 to be transmitted wirelessly to the devices 3106.

Figure 37:
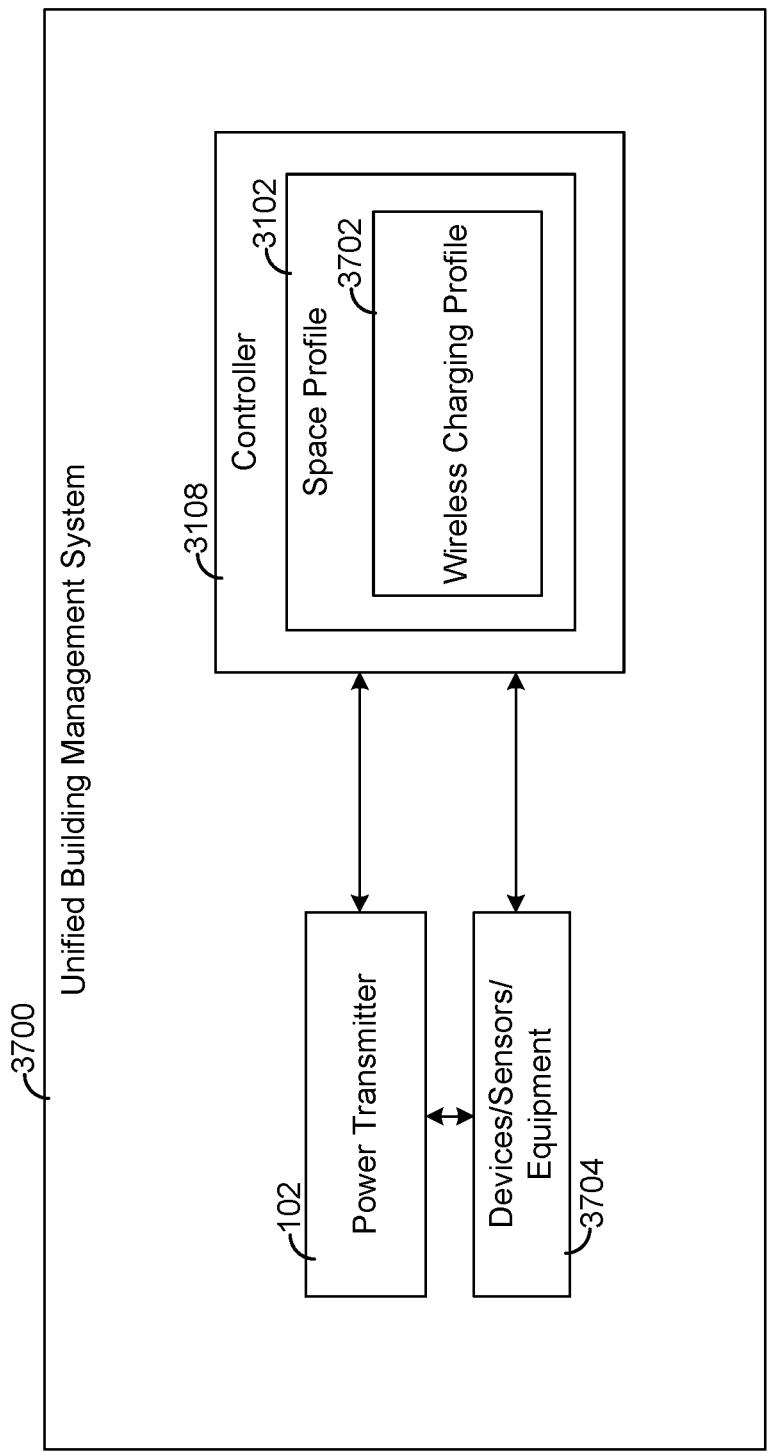
FIG. 37 is a block diagram showing a wireless charging profile in a space profile for a space served by the power transmitter of FIG. 1A, according to an exemplary embodiment.

Referring now to FIG. 37, a block diagram showing a wireless charging profile 3702 in the space profile 3102 for a space served by the power transmitter 102 is shown, according to an exemplary embodiment. The wireless charging profile 3702 facilitates control of the power transmitter 102 by the controller 3108 of the unified building management system 3700. The wireless charging profile 3702 may facilitate unified management of power to various devices, sensors, and equipment 3704 across various building domains without regard to the traditional segmentation between such devices. Accordingly, a wireless charging system and a wireless charging profile may be highly useful in implementing a building management system.

Furthermore, by providing consistent power to various devices and sensors in a unified building management system (UBMS) 3700, such devices and sensors may be deployed and designed to eliminate constraints traditionally imposed by power requirement in small devices. For example, small sensors that may have been traditionally powered by small batteries—and hence were designed to provide low resolution data at large time intervals—may be replaced by sensors that provide more data at higher accuracy and shorter time intervals without the issue of running out of power for such sensors. The data collected in the UBMS 3700 may therefore be substantially improved and increased, which may be particularly useful in a unified sensor network of the UBMS 3700, resulting in overall better control of the system within a building or campus.

Figure 38:
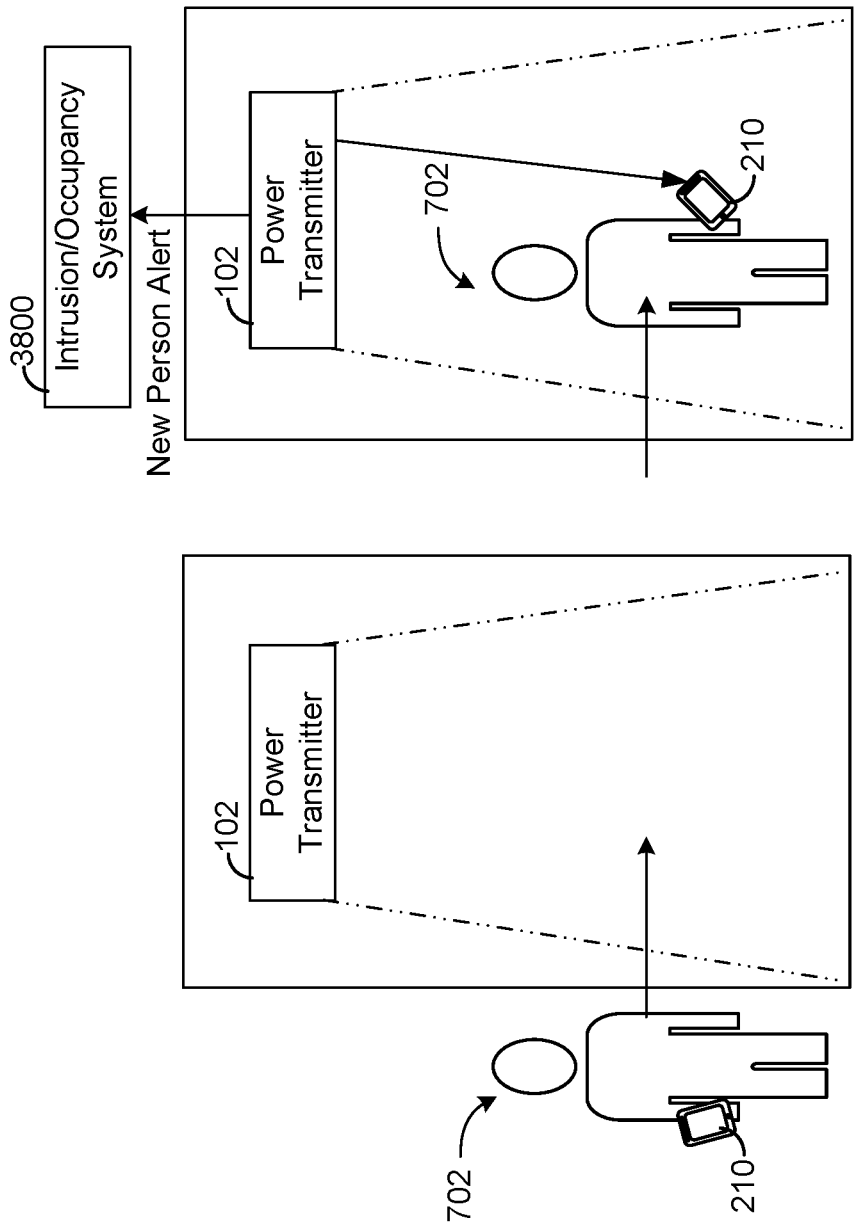
FIG. 38 is an illustration of the power transmitter of FIG. 1A used for intrusion or occupancy detection, according to an exemplary embodiment.

Referring now to FIG. 38, an illustration of the power transmitter 102 used for intrusion or occupancy detection is shown, according to an exemplary embodiment. Most people today carry electronic devices with them as the move in spaces and places. As shown in FIG. 38, a person with the user device 210 can move from outside a charging zone to inside a charging zone. When electronic devices move into a charging zone, as explained in detail above, a connection may be established between the power transmitter 102 and the user device 210. The power transmitter 102 may thereby determine that a person has carried the device 210 into the charging zone. The power transmitter 102 may then provide a new person alert to an intrusion or occupancy system 3800. For example, in some embodiments, a security alarm is triggered to indicate that an unknown person has entered a restricted area covered by the charging zone.

Figure 39:
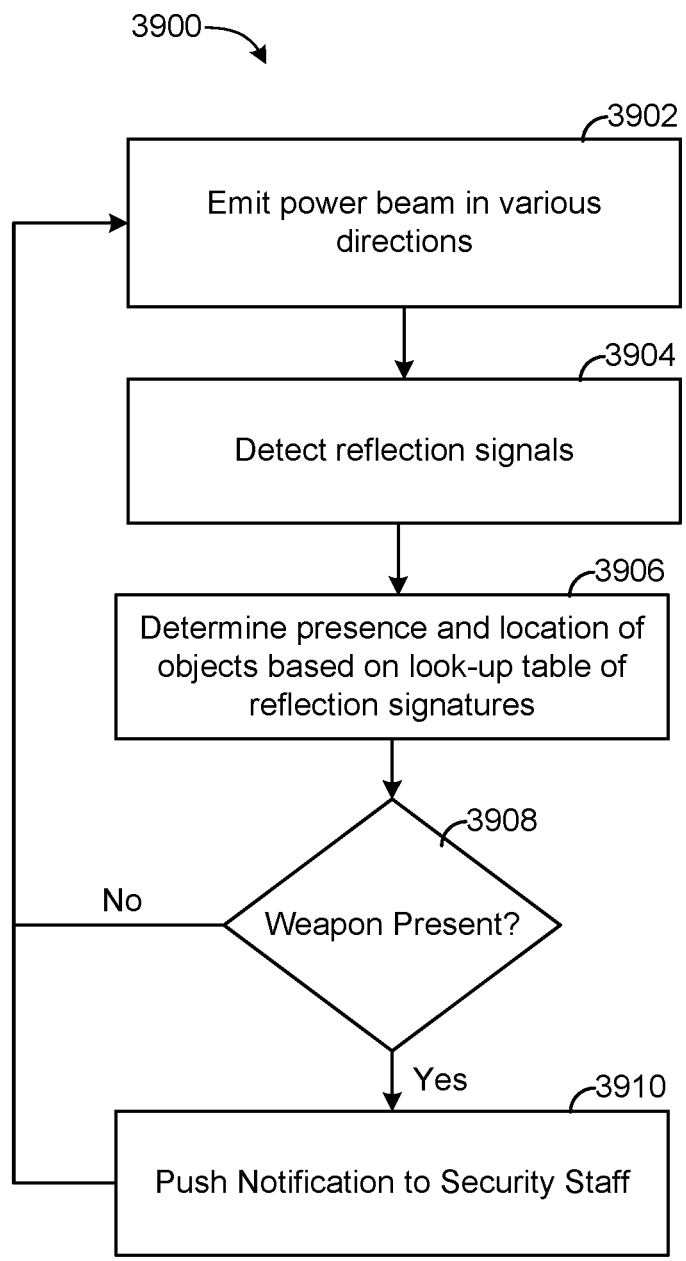
FIG. 39 is a flowchart of a process of determining presence and location of objects in a place and generating notifications based on the presence and location of the objects with one or more power transmitters, according to an exemplary embodiment.

Referring now to FIG. 39, a flowchart of a process 3900 for using one or more power transmitters (e.g., similar to or including the power transmitter 102) to determine the presence and location of various objects in a place and generate notifications relating thereto is shown, according to an exemplary embodiment. The power transmitter 102 may be controlled to emit various power beams in various directions (step 3902). The directions of these beams may be selected to provide substantially even coverage of an entire space or place. The power beams may be absorbed and reflected by various objects in various ways, such that various materials and/or objects may have characteristic reflection signatures (step 3904). Accordingly, the power transmitter 102 may be configured to detect reflection signals from the various beams and determine the presence of various materials or objects by associated the detected reflection signals with materials using a look-up table of material reflection signatures (step 3906).

In some embodiments, the power transmitter 102 determines, based on the objects/materials detected using the look-up table, whether a weapon is present in the space (step 3908). For example, the metal used in typical firearms may have a clear characteristic reflection signature that may indicate that a gun is present in a particular location. If a weapon is present, a push notification may be sent to security staff to alert the security staff of the weapon (step 3910). The power beam emission and reflection detection process may be repeatedly constantly, regularly (e.g., every ten minutes), on demand from a user, or based on some other trigger.

As another example, in some embodiments the chemical make-up of the air in a space may alter reflection signatures. For example, air with high carbon monoxide levels may be detectable based on the reflection of power beams, which may be correlated with a large number of people in a space or some other event that may trigger warnings, alarms, or other control signals to various building equipment. As another example, smoke may be detectable in the air using power beam reflections, for example to detect a building fire, unauthorized cigarette smokers, etc. As another example, a rapid change in environmental conditions detected in this way may trigger an event.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As used herein, the terms "circuit" and "controller" used herein may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" or "controller" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building management system of a building comprising one or more computer-readable storage media having instructions stored thereon that, when executed by one or more processors, cause the one or more processors to:
   operate a wireless power transmitter to transmit wireless power to one or more first building devices located within a zone of the building;
   receive an indication of a zone power mode for the zone; and
   operate the wireless power transmitter to switch from transmitting the wireless power to the one or more first building devices to transmitting the wireless power to one or more second building devices located within the zone of the building, wherein the one or more second building devices are indicated by the zone power mode, wherein at least one building device of the one or more second building devices is a different building device than the one or more first building devices.

2. The building management system of claim 1, wherein the one or more first building devices comprise a zone sensor configured to measure an environmental condition of the zone with the wireless power.

3. The building management system of claim 1, wherein one building device of the one or more first building devices is also a building device of the one or more second building devices;
   wherein the instructions cause the one or more processors to:
      cause the wireless power transmitter to provide a first level of wireless power to the one building device; and
      cause the wireless power transmitter to provide a second level of wireless power to the one building device in response to receiving the indication of the zone power mode for the zone.

4. The building management system of claim 1, wherein a building device of the one or more first building devices is a building device type different than another building device type of another building device of the one or more second building devices.

5. The building management system of claim 4, wherein the zone power mode is a presentation mode, wherein the one or more first building devices comprise a lighting device and the one or more second building devices comprise a projector.

6. The building management system of claim 1, wherein the one or more first building devices are a first plurality of building devices and the one or more second building devices are a second plurality of building devices;
wherein one building device of the first plurality of building devices is also a building device of the second plurality of building devices.

7. The building management system of claim 6, wherein the zone power mode is at least one of:
a conference call mode associated with one or more first configuration settings for the one or more first building devices and the one or more second building devices;
a video presentation mode associated with one or more second configuration settings for the one or more first building devices and the one or more second building devices;
a zone occupied mode associated with one or more third configuration settings for the one or more first building devices and the one or more second building devices; or
a zone unoccupied mode associated with one or more fourth configuration settings for the one or more first building devices and the one or more second building devices.

8. The building management system of claim 1, wherein the one or more computer-readable storage media store a device inventory of the zone, wherein the device inventory indicates the one or more first building devices and the one or more second building devices;
wherein the instructions cause the one or more processors to operate the wireless power transmitter to switch from transmitting the wireless power to the one or more first building devices to transmitting the wireless power to the one or more second building devices based on the indication of the zone power mode and the device inventory.

9. The building management system of claim 8, wherein the instructions cause the one or more processors to:
cause the wireless power transmitter to communicate with the one or more first building devices and the one or more second building devices and receive a plurality of indications, each of the plurality of indications indicating one building device of the one or more first building devices and the one or more second building devices; and
generate the device inventory based on the plurality of indications.

10. A method for building management comprising:
operating, by a processing circuit, a wireless power transmitter to transmit wireless power to one or more first building devices located within a zone of a building;
receiving, by the processing circuit, an indication of a zone power mode for the zone; and
operating, by the processing circuit, the wireless power transmitter to switch from transmitting the wireless power to the one or more first building devices to transmitting the wireless power to one or more second building devices located within the zone of the building, wherein the one or more second building devices are indicated by the zone power mode, wherein at least one building device of the one or more second building devices is a different building device than the one or more first building devices.

11. The method of claim 10, wherein the one or more first building devices comprise a zone sensor configured to measure an environmental condition of the zone with the wireless power.

12. The method of claim 10, wherein one building device of the one or more first building devices is also a building device of the one or more second building devices;
wherein the method further comprising:
causing, by the processing circuit, the wireless power transmitter to provide a first level of wireless power to the one building device; and
causing, by the processing circuit, the wireless power transmitter to provide a second level of wireless power to the one building device in response to receiving the indication of the zone power mode for the zone.

13. The method of claim 10, wherein a building device of the one or more first building devices is a building device type different than another building device type of another building device of the one or more second building devices.

14. The method of claim 13, wherein the zone power mode is a presentation mode, wherein the one or more first building devices comprise a lighting device and the one or more second building devices comprise a projector.

15. The method of claim 10, wherein the one or more first building devices are a first plurality of building devices and the one or more second building devices are a second plurality of building devices;
wherein one building device of the first plurality of building devices is also a building device of the second plurality of building devices.

16. The method of claim 15, wherein the zone power mode is at least one of:
a conference call mode associated with one or more first configuration settings for the one or more first building devices and the one or more second building devices;
a video presentation mode associated with one or more second configuration settings for the one or more first building devices and the one or more second building devices;
a zone occupied mode associated with one or more third configuration settings for the one or more first building devices and the one or more second building devices; or
a zone unoccupied mode associated with one or more fourth configuration settings for the one or more first building devices and the one or more second building devices.

17. The method of claim 10, further comprising:
storing, by the processing circuit, in a media device, a device inventory of the zone, wherein the device inventory indicates the one or more first building devices and the one or more second building devices; and
operating, by the processing circuit, the wireless power transmitter to switch from transmitting the wireless power to the one or more first building devices to transmitting the wireless power to the one or more second building devices based on the indication of the zone power mode and the device inventory.

18. The method of claim 17, further comprising:
causing, by the processing circuit, the wireless power transmitter to communicate with the one or more first building devices and the one or more second building devices and receive a plurality of indications, each of the plurality of indications indicating one building device of the one or more first building devices and the one or more second building devices; and generating, by the processing circuit, the device inventory based on the plurality of indications.

19. One or more storage media storing instructions thereon that, when executed by one or more processors, cause the one or more processors to:
   operate a wireless power transmitter to transmit wireless power to one or more first building devices located within a zone of a building;
   receive an indication of a zone power mode for the zone; and
   operate the wireless power transmitter to switch from transmitting the wireless power to the one or more first building devices to transmitting the wireless power to one or more second building devices located within the zone of the building, wherein the one or more second building devices are indicated by the zone power mode, wherein at least one building device of the one or more second building devices is a different building device than the one or more first building devices.

20. The one or more storage media of claim 19, wherein the zone power mode is at least one of:
   a conference call mode associated with one or more first configuration settings for the one or more first building devices and the one or more second building devices;
   a video presentation mode associated with one or more second configuration settings for the one or more first building devices and the one or more second building devices;
   a zone occupied mode associated with one or more third configuration settings for the one or more first building devices and the one or more second building devices; or
   a zone unoccupied mode associated with one or more fourth configuration settings for the one or more first building devices and the one or more second building devices.

* * * * *